(12) United States Patent
Nomura et al.

(10) Patent No.: US 6,570,718 B2
(45) Date of Patent: May 27, 2003

(54) ZOOM LENS HAVING A CAM MECHANISM

(75) Inventors: Hiroshi Nomura, Saitama (JP); Nobuaki Aoki, Tokyo (JP); Yoshihiro Yamazaki, Saitama (JP); Satoru Nakamura, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/772,896

(22) Filed: Jan. 31, 2001

(65) Prior Publication Data

US 2001/0015859 A1 Aug. 23, 2001

(30) Foreign Application Priority Data

Feb. 1, 2000 (JP) ....................................... 2000-023842
Feb. 1, 2000 (JP) ....................................... 2000-023843

(51) Int. Cl.[7] .............................................. G02B 15/14
(52) U.S. Cl. ....................................... 359/699; 359/700
(58) Field of Search ................................. 359/699, 700, 359/701, 702–704, 819

(56) References Cited

U.S. PATENT DOCUMENTS

| 5,313,329 | A |   | 5/1994  | Ueda ........................... 359/676 |
| 5,589,987 | A |   | 12/1996 | Tanaka ......................... 359/701 |
| 5,812,889 | A |   | 9/1998  | Nomura et al. ................ 396/87 |
| 6,014,269 | A |   | 1/2000  | Nomura et al. ............. 359/701 |
| 6,195,212 | B1 | * | 2/2001 | Miyamoto ................... 359/699 |

FOREIGN PATENT DOCUMENTS

JP          6-194555 A   *   7/1994     .................. 359/700

* cited by examiner

Primary Examiner—Huy Mai
(74) Attorney, Agent, or Firm—Greenblum & Bernstein, P.L.C.

(57) ABSTRACT

A zoom lens includes a cam barrel having bottomed cam grooves formed on an inner peripheral surface thereof, a lens frame guided in an optical axis direction, cam followers, and resilient supports which are resiliently deformable radially. Each bottomed cam groove includes a zoom section, and an accommodation section. Each bottomed cam groove is formed so that a depth of the accommodation section is greater than the zoom section. The resilient bias of each resilient support causes the cam followers to be biased against the bottomed cam grooves wherein the follower pins are fitted in the bottomed cam grooves so that no play occurs when the bottomed cam grooves are in the zoom section. Each resilient support is free from being elastically deformed so that the cam followers are inserted in the bottomed cam grooves with a predetermined amount of play when the bottomed cam grooves are positioned in the accommodation section.

25 Claims, 18 Drawing Sheets

ZOOM LENS HAVING A CAM MECHANISM

BACKGROUND OF THE INVENTION

1. Field of the Invention

The present invention relates to a zoom lens, or a zoom lens barrel, which is provided with a cam mechanism using bottomed cam grooves formed on an inner peripheral surface of a cam barrel. At least one movable lens group is moved in the direction of the optical axis of the photographic optical system in a predetermined manner in accordance with the profiles of the bottomed cam grooves by rotation of the cam barrel.

2. Description of the Related Art

A zoom lens having a cam mechanism which uses bottomed cam grooves formed on an inner peripheral surface of a cam barrel so that one or more movable lens groups guided in the direction of the optical axis of the photographic optical system (i.e., in the optical axis direction) without rotating about the optical axis are moved in a predetermined manner by rotation of the cam barrel to obtain a continuously variable focal length is known in the art. In such a cam mechanism using bottomed cam grooves, if each cam follower pin formed on a lens frame is fitted in the zoom section (an operational section for varying the focal length) of the corresponding bottomed cam groove with a predetermined amount of play, the lens group supported by the lens frame may be eccentric and/or tilt relative to the optical axis. This deteriorates the optical performance of the zoom lens.

Such eccentricity or tilt of the lens group causes substantial problems, especially in a zoom lens of a digital camera, because object images are formed on the sensitive surface of a small CCD (CCD image sensor) which is much smaller than the picture plane of conventional cameras using light sensitive film. Namely, upon assembly, every lens element of a digital camera must be optically centered, correctly spaced, and held firmly with a relatively high precision ten times greater than that required in conventional cameras using light-sensitive film. For instance, if the angle of view is constant, the focal length of a photographing lens becomes shorter as the size of the picture plane reduces, which in turn reduces the sizes of all the elements of the photographing lens such as lens elements, and lens frames. Therefore, an influence that a tolerance (e.g., 10 μm) has on the photographing lens system of a digital camera is much larger than an influence that the same tolerance has on the photographing lens system of a conventional camera using light-sensitive film. Accordingly, manufacturing error which falls within tolerance in the optical performance in the photographing optical system of a conventional camera using light-sensitive film can be out of tolerance in optical performance in the photographing optical system of a digital camera. Specifically in the photographic lens system of a digital camera, influence that eccentricity or tilt of a lens group relative to the optical axis has on the optical performance of the photographic lens system is larger than influence that a deviation of the same lens group from the original position in the optical axis direction.

To prevent such eccentricity and tilt from occurring, a mechanism for removing play between the cam follower pins and the bottomed cam grooves in which the cam followers are respectively fitted with resilient supports which support the cam follower pins has been proposed. The resilient supports become resiliently deformed in a radial direction to bias the cam follower pins against the bottomed cam grooves, respectively, to thereby remove the play between the cam follower pins and the bottomed cam grooves, so that each cam follower pin follows along the corresponding bottomed cam groove with a sufficient frictional resistance being generated therebetween.

However, according to such a play removing mechanism, if the resilient supports remain resiliently deformed over the long term, the resilient bias (i.e., the resilient biasing force) of each resilient support gradually becomes weak, which may deteriorate the performance of the mechanism.

Another problem present in a zoom lens having a cam mechanism using bottomed cam grooves, is that although each bottomed cam groove is provided with a leading section provided for leading each corresponding cam follower pin from the cam follower insertion opening of the bottomed cam groove, which is formed on the cam barrel, to the zoom section of the bottomed cam groove (which is provided for moving the lens frame between a telephoto position thereof and a wide-angle position thereof in accordance with rotation of the cam barrel) ease of assembling and disassembling the zoom lens deteriorates if each cam follower is biased against not only a portion of the bottomed cam groove, which is used during operation of the zoom lens, but also another portion of the bottomed cam groove which is not used during operation of the zoom lens since the cam mechanism cannot be assembled or disassembled smoothly due to the frictional force generated between the cam follower pins and the bottomed cam grooves.

SUMMARY OF THE INVENTION

The present invention has been devise in view of the above-mentioned problems, and accordingly, an object of the present invention is to provide a zoom lens having a cam mechanism which reliably prevents eccentricity and tilt of a lens group relative to the optical axis from occurring during operation of the zoom lens while maintaining the performance of the prevention of lens eccentricity and tilt over a long term.

Another object of the present invention is to provide a zoom lens having a cam mechanism which reliably prevents eccentricity and tilt of a lens group relative to the optical axis from occurring during operation of the zoom lens and which excels in ease of assembly and disassembly the zoom lens.

To achieve the object mentioned above, according to an aspect of the present invention, a zoom lens is provided, including a cam barrel driven to rotate about an optical axis; bottomed cam grooves formed on an inner peripheral surface of the cam barrel; a lens frame guided in an optical axis direction; cam followers which project radially from the lens frame to be respectively engaged with the bottomed cam grooves; and resilient supports which respectively support the cam followers, each of the resilient supports being resiliently deformable in a radial direction, a resilient bias of each of the resilient supports causing each of the cam followers to be biased against a corresponding bottomed cam groove of the bottomed cam grooves. Each bottomed cam groove includes a zoom section for moving the lens frame between a telephoto position and a wide-angle position thereof in the optical axis direction in accordance with a rotational movement of the cam barrel; and an accommodation section for moving the lens frame to an accommodation position thereof, wherein a photographic operation is not performed. Each bottomed cam groove is formed so that a depth of the accommodation section is greater than a depth of the zoom section in the radial direction of the cam barrel. The resilient bias of each of the resilient supports causes each of the cam followers to be biased against each of the bottomed cam grooves wherein the follower pins are respectively fitted in the bottomed cam grooves so that no play exists when each of the bottomed cam grooves is positioned in the zoom section, and each of the resilient supports is free from being elastically deformed in the radial direction so that the cam followers are respectively inserted in the bottomed cam grooves with a predetermined amount of play when each of the bottomed cam grooves is positioned in the accommodation section.

In the bottomed cam grooves includes a first set of bottomed cam grooves having same profiles and a second set of bottomed cam grooves having same profiles, the profiles of the second set of bottomed cam grooves being different from the profiles of the first set of bottomed cam grooves. The lens frame includes a first lens frame and a second lens frame. The cam followers include a first set of cam followers which are provided on the first lens frame and a second set of cam followers which are provided on the second lens frame. The first set of cam followers are respectively engaged with the first set of bottomed cam grooves, and the second set of cam followers are respectively engaged with the second set of bottomed cam grooves. The resilient supports include a first set of resilient supports which resiliently support the first set of cam followers, and a second set of resilient supports which resiliently support the second set of cam followers. Each bottomed cam groove of the first set of bottomed cam grooves and the second set of bottomed cam grooves is formed so that the depth of the accommodation section is greater than the depth of the zoom section in the radial direction of the cam barrel.

Preferably, the zoom sections of each bottomed cam groove of the first set of bottomed cam grooves and each corresponding bottomed cam groove of the second set of bottomed cam grooves are formed on the inner peripheral surface of the cam barrel in the same range in a circumferential direction of the cam barrel.

Preferably, three of each of the cam followers, the bottomed cam grooves, and the resilient supports are provided at an equi-angular distance about the optical axis.

In an embodiment, the zoom section and the accommodation section of each of the bottomed cam grooves respectively includes a bottom surface; and a pair of opposing tapered side surfaces connected to the bottom surface, the pair of tapered side surfaces being respectively tapered so as to diverge away from each other as the pair of tapered side surfaces extend away from the bottom surface.

Preferably, a width of the bottom surface in the zoom section and a width of the bottom surface in the accommodation section are the same.

In an embodiment, the zoom lens further includes a linear guide barrel which is associated with the lens frame to guide the lens frame in the optical axis direction.

Preferably, the linear guide barrel is positioned inside the cam barrel and includes linear guide through-slots extending parallel to the optical axis; wherein the resilient supports include guide projections which are fitted in the linear guide through-slots from the inside of the linear guide barrel, respectively, so that the resilient supports are resiliently deformable inwards in the radial direction; and the cam followers project from the guide projections outwards in the radial direction to be respectively fitted in the bottomed cam grooves.

Preferably, the linear guide barrel and the can barrel are connected to each other to be relatively immovable in the optical axis direction and relatively rotatable about the optical axis.

Preferably, the resilient supports are formed integrally with the lens frame so that each of the resilient supports can be resiliently deformed in the radial direction.

The above-described zoom lens can be incorporated in a digital camera.

According to another aspect of the present invention, a zoom lens is provided, including a linear guide barrel, guided in an optical axis direction without rotating about the optical axis, having linear guide through-slots which extend parallel to the optical axis; a cam barrel fitted on the linear guide barrel to be immovable in the optical axis direction relative to the linear guide barrel and rotatable about the optical axis relative to the linear guide barrel, the cam barrel having bottomed cam grooves which are formed on an inner peripheral surface of the cam barrel; a lens frame having cam followers which are respectively engaged with the bottomed cam grooves, and guide projections which are respectively engaged with the linear guide through-slots; and resilient supports formed on the lens frame to support the cam followers, respectively, each of the resilient supports being resiliently deformable radially, a resilient bias of each of the resilient supports causing each of the cam followers to be biased against a corresponding bottomed cam groove of the bottomed cam grooves. Each of the bottomed cam grooves includes a zoom section for moving the lens frame, in the optical axis direction, between a telephoto position and a wide-angle position thereof in accordance with rotation of the cam barrel; and an accommodation section for moving the lens frame to an accommodation position thereof, wherein a photographic operation is not performed. Each of the bottomed cam grooves is formed so that a depth of the accommodation section is greater than a depth of the zoom section in a radial direction of the cam barrel. The resilient bias of each of the resilient supports causes each of the cam followers to be biased against each of the bottomed cam grooves wherein the follower pins are respectively fitted in the bottomed cam grooves so that no play occurs when each of the bottomed cam grooves is positioned in the zoom section. Each of the resilient supports is free from being elastically deformed in the radial direction so that the cam followers are respectively inserted in the bottomed cam grooves with a predetermined amount of play when each of the bottomed cam grooves is positioned in the accommodation section.

According to another aspect of the present invention, a zoom lens is provided, including a cam barrel driven to rotate about an optical axis; bottomed cam grooves formed on an inner peripheral surface of the cam barrel; a lens frame guided in an optical axis direction; cam followers which project radially from the lens frame to be respectively engaged with the bottomed cam grooves; and resilient supports which respectively support the cam followers, each of the resilient supports being resiliently deformable in a radial direction, a resilient bias of each of the resilient supports causing each of the cam followers to be biased against a corresponding bottomed cam groove of the bottomed cam grooves. Each of the bottomed cam grooves includes a deep groove portion, so that each of the resilient supports is free from being elastically deformed in the radial direction so that the cam followers are respectively inserted in the bottomed cam grooves with a predetermined amount of play when each of the bottomed cam grooves is positioned in the deep groove portion. The deep groove portion includes at least a part of an assembly section of each of the bottomed cam grooves, through which a corresponding cam follower of the cam followers passes only during assembly of the zoom lens.

In an embodiment, each of the bottomed cam grooves further includes a normal-depth groove portion whose depth is smaller than a depth of the deep groove portion in the radial direction, so that, when each of the cam followers is positioned in the normal-depth groove portion, the resilient bias of each of the resilient supports causes each of the cam followers to be biased against each of the bottomed cam grooves wherein the follower pins are respectively fitted in the bottomed cam grooves with no play. The normal-depth groove portion includes a zoom section for moving the lens frame between a telephoto position and a wide-angle position thereof in the optical axis direction in accordance with rotation of the cam barrel.

In an embodiment, the deep groove portion includes a leading section for leading the corresponding cam follower from a cam follower insertion opening, which is open at one end of the cam barrel, to the normal-depth groove portion. Each of the bottomed cam grooves includes a shallow groove portion in the middle of the leading section, and a depth of the shallow groove portion is smaller than a depth of the normal-depth groove portion in the radial direction of the cam barrel.

Preferably, three of each of the cam followers, the bottomed cam grooves, and the resilient supports are provided at an equi-angular distance about the optical axis.

In an embodiment, the normal-depth groove portion and the deep groove portion of each bottomed cam grooves respectively includes a bottom surface; and a pair of opposing tapered side surfaces connected to the bottom surface, the pair of tapered side surfaces being respectively tapered so as to diverge away from each other as the pair of tapered side surfaces extend away from the bottom surface.

Preferably, a width of the bottom surface in the normal-depth groove portion and a width of the bottom surface in the deep groove portion are the same.

According to another aspect of the present invention, a zoom lens is provided, including a cam barrel driven to rotate about an optical axis; first bottomed cam grooves formed on an inner peripheral surface of the cam barrel; second bottomed cam grooves formed on the inner peripheral surface of the cam barrel and having different profiles from the first bottomed cam grooves; a first lens frame having first cam followers which are respectively engaged with the first bottomed cam grooves; a second lens frame having second cam followers which are respectively engaged with the second bottomed cam grooves; and a linear guide barrel which is associated with the first lens frame and the second lens frame to guide the first lens frame and the second lens frame in an optical axis direction. Each of the first bottomed cam grooves includes a first zoom section for moving the first lens frame between a telephoto position thereof and a wide-angle position thereof in accordance with rotation of the cam barrel; a first leading section for leading corresponding one of the first cam followers from a first cam follower insertion opening, which is open at one end of the cam barrel, toward the first zoom section; and a terminal section positioned on the opposite side of the first zoom section with respect to the first leading section. Each of the first leading section and the terminal section is formed as a first deep groove portion used only during assembly of the zoom lens, a depth of the first deep groove portion being greater than a depth of the first zoom section in a radial direction of the cam barrel. Each of the second bottomed cam grooves includes a second zoom section for moving the second lens frame between a telephoto position thereof and a wide-angle position thereof in accordance with rotation of the cam barrel; and a second leading section for leading corresponding one of the second cam followers from a second cam follower insertion opening which is open at the one end of the cam barrel, toward the second zoom section. The second leading section is formed as a second deep groove portion used during assembly of the zoom lens, a depth of the second deep groove portion being greater than a depth of the second zoom section in the radial direction of the cam barrel. The terminal section and the second cam follower insertion opening are formed at the same circumferential position in a circumferential direction of the cam barrel. Upon assembly of the first lens frame and the second lens frame to the cam barrel and the linear guide barrel, the first cam followers are respectively inserted into the first leading sections via the first cam follower insertion openings, the linear guide barrel and the cam barrel are rotated relative to each other until the first cam followers reaches respective the terminal section of corresponding one of the first bottomed cam grooves, and subsequently, the second cam followers are respectively inserted into the second leading sections via the second cam follower insertion openings.

Preferably, the leading section includes a shallow groove portion in the middle of the second leading section; and a depth of the shallow groove portion is smaller than a depth of the second zoom section in the radial direction of the cam barrel.

In an embodiment, each of the first bottomed cam grooves includes a first connecting section positioned between the first zoom section and the terminal section, through which a corresponding cam follower of the first cam followers passes only during assembly of the zoom lens, wherein a depth of the first connecting section is the same as the depth of the first zoom section in the radial direction. The first cam follower can be held in the terminal section of the first bottomed cam groove, due to the difference of depth between the terminal section and the connecting section.

In an embodiment, each of the second bottomed cam grooves includes a second connecting section positioned between the second zoom section and the second leading section, through which a corresponding cam follower of the second cam followers passes only during assembly of the zoom lens, wherein a depth of the second connecting section is the same as the depth of the second zoom section in the radial direction. The second cam follower can be held in the leading section of the second bottomed cam groove, due to the difference of depth between the leading section and the connecting section.

In an embodiment, the zoom lens further includes first resilient supports which respectively support the first cam followers, each of the first resilient supports being resiliently deformable in the radial direction, a resilient bias of each of the first resilient supports causing each of the first cam followers to be biased against a corresponding bottomed cam groove of the first bottomed cam grooves; and second resilient supports which respectively support the second cam followers, each of the second resilient supports being resiliently deformable in the radial direction, a resilient bias of each of the second resilient supports causing each of the second cam followers to be biased against a corresponding bottomed cam groove of the second bottomed cam grooves. The first follower pins are respectively fitted in the first zoom section of the first bottomed cam grooves so that no play occurs during zooming, due to a resilient bias of the first resilient supports which are elastically deformed in the radial direction. The second follower pins are respectively fitted in the second zoom section of the second bottomed cam grooves so that no play occurs during zooming, due to a resilient bias of the second resilient supports which are elastically deformed in the radial direction. The first follower pins are respectively inserted in the first leading section with a predetermined amount of play and the terminal section of the first bottomed cam grooves, so that each of the first resilient supports is free from being elastically deformed in the radial direction. The second follower pins are respectively inserted in the second leading section of the second bottomed cam grooves with a predetermined amount of play, so that each of the second resilient supports is free from being elastically deformed in the radial direction.

Preferably, the linear guide barrel and the cam barrel are connected to each other to be relatively immovable in the optical axis direction and relatively rotatable about the optical axis.

The above-described zoom lens can be incorporated in a digital camera.

The present disclosure relates to subject matter contained in Japanese Patent Applications Nos. 2000-23842 and 2000-23843 (both filed on Feb. 1, 2000) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
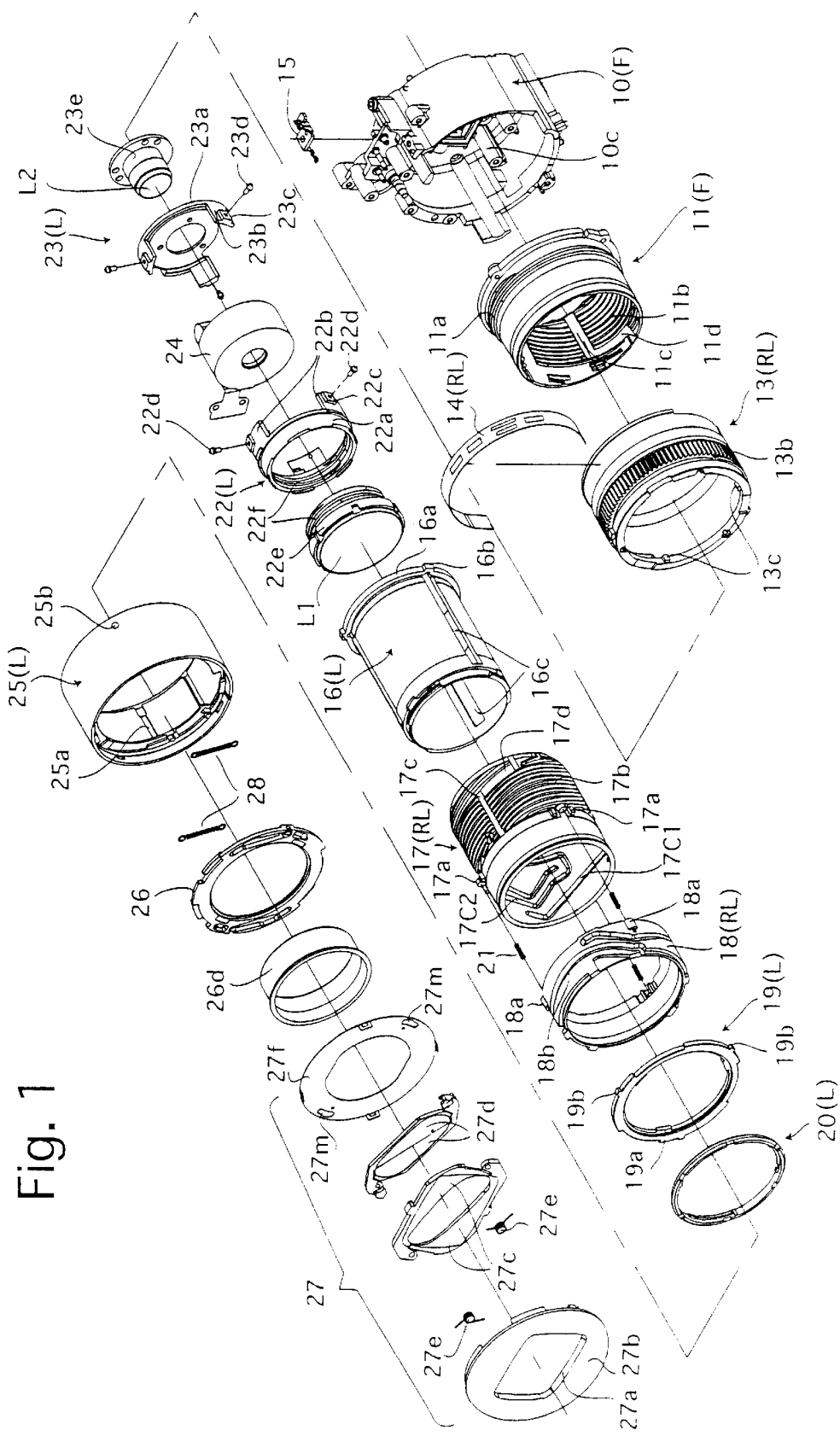
FIG. 1 is an exploded perspective view of an embodiment of a zoom lens according to the present invention, showing the overall structure thereof.

A preferred embodiment of a zoom lens (zoom lens barrel) according to the present invention that is incorporated in a digital camera will be hereinafter discussed. Firstly, the overall structure of the zoom lens will be discussed with reference mainly to FIGS. 1 and 2. In the drawings and the following descriptions, symbols "(F)", "(L)" and "(RL)" which are each appended as a suffix to the reference numeral of some elements of the zoom lens barrel indicate that the element is stationary, the element is movable linearly along an optical axis O of the zoom lens without rotating about the optical axis O, and the element is movable along the optical axis O while rotating about the optical axis O, respectively.

Figure 2:
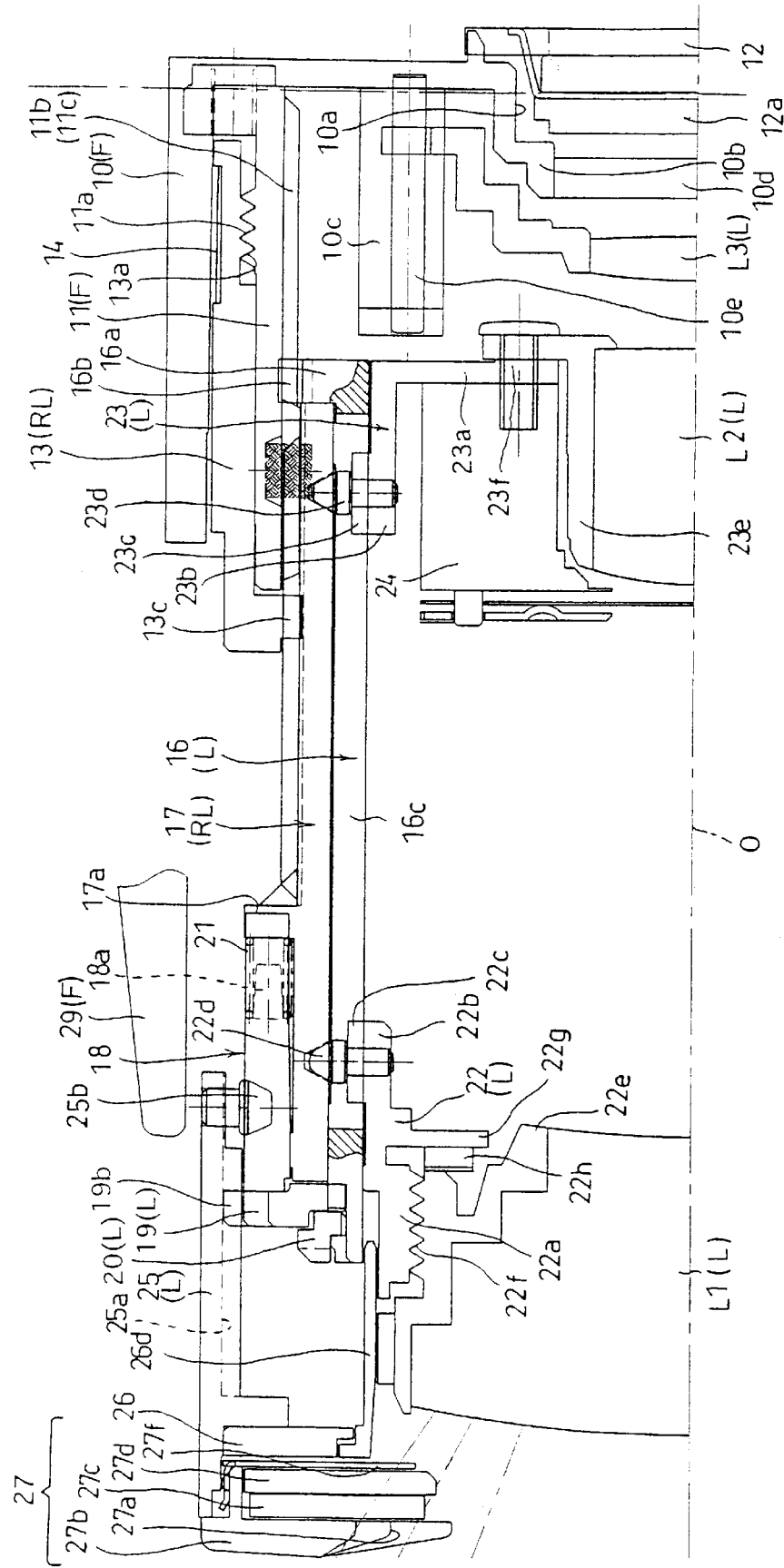
FIG. 2 is an axial cross sectional view of the zoom lens shown in FIG. 1, showing the zoom lens above the optical axis thereof.

The photographic optical system of the zoom lens includes three lens groups; namely, a first lens group (front lens group) L1 (L), a second lens group (middle lens group) L2 (L) and a third lens group (rear lens group) L3 (L), in this order from the object side (the left side as viewed in FIG. 2). The zoom lens performs zooming by moving the first and second lens groups L1 and L2 along the optical axis O relative to the sensitive surface of a stationary CCD 12a (see FIG. 2) and at the same time changing the space between the first and second lens groups L1 and L2 in a predetermined manner. The zoom lens performs a focusing operation by moving the third lens group L3 along the optical axis O to bring an object into focus. The third lens group L3 functions as a focusing lens group which is driven along the optical axis O independently of the axial position of each of the first and second lens groups L1 and L2. Thus, the zoom lens is an internal-focusing type zoom lens having a lens construction which allows the focus to be altered by moving the rearmost lens group provided as a focusing lens group internally within the lens barrel.

The zoom lens is provided with a housing 10(F) which is fixed to a camera body of a digital camera (not shown). The housing 10 can be integral with the camera body to be provided as an element thereof. The zoom lens is provided in the housing 10 with a stationary barrel 11(F) that is fixed to the housing 10. The stationary barrel 11 is provided on an outer peripheral surface thereof with a fine male thread 11a. The stationary barrel 11 is provided on an inner peripheral surface thereof with a female helicoid (female helicoidal thread) 11b and three linear guide grooves 11c (only one is shown in FIG. 1) extending parallel to the optical axis O, i.e., extending in the optical axis direction. The three linear guide grooves 11c are formed to cut across the female helicoid 11b. The three linear guide grooves 11c are formed at 120° intervals (i.e., at an equi-angular distance) about the axis of the stationary barrel 11.

As shown in FIG. 2, the housing 10 is provided with a CCD insertion opening 10a, a filter fixing portion 10b and a focusing lens group guide portion 10c. The CCD 12a which is fixed to a substrate 12 is positioned in the CCD insertion opening 10a. A filter 10d such as a low-pass filter is fixed to the filter fixing portion 10b. The third lens group L3 is guided by the focusing lens group guide portion 10c to be movable in the optical axis direction. The axial position of the third lens group L3 on the optical axis O is determined by the direction of rotation of a feed screw 10e and the angle of rotation (amount of rotation) thereof. The feed screw 10e extends parallel to the optical axis O from the camera body in the focusing lens group guide portion 10c. The feed screw 10e is driven by a pulse motor (not shown) provided in the camera body. The angle of rotation of the feed screw 10e is controlled via an encoder (not shown) of the pulse motor.

The zoom lens is provided on the stationary barrel 11 with a rotational barrel 13 (RL) The rotational barrel 13 is provided on an inner peripheral surface thereof with a fine female thread 13a which meshes with the fine male thread 11a of the stationary barrel 11. The rotational barrel 13 is provided on an outer peripheral surface thereof with a circumferential gear 13b (see FIG. 1). The rotational barrel 13 is driven to rotate about the optical axis O by a drive pinion (not shown) which meshes with the circumferential gear 13b. When the rotational barrel 13 is driven to rotate about the optical axis O, the rotational barrel 13 moves in the optical axis direction while rotating about the optical axis O in accordance with the engagement of the fine female thread 13a with the fine male thread 11a. The rotational barrel 13 is provided at the front end of an inner peripheral surface thereof with three inward projections 13c at 120° intervals about the axis of the rotational barrel 13. As shown in FIG. 1, a flexible coding plate 14 (RL) is fixed on an outer peripheral surface of the rotational barrel 13 along a circumference thereof, while a brush 15 (F) that is in contact with the coding plate 14 is fixed to the housing 10. The brush 15 remains in sliding contact with the coding plate 14 regardless of a movement of the coding plate 14 relative to the brush 15 when the coding plate 14 moves in the optical axis direction in accordance with the engagement of the fine female thread 13a with the fine male thread 11a, so as to sense the rotational position of the rotational barrel 13 as digital and/or analogue information. The fine female thread 13a, which is provided on the rotational barrel 13, is provided as a device for supporting the rotational barrel 13 on the stationary barrel 11 so that the rotational barrel 13 can rotate freely about the optical axis O on the stationary barrel 11. However, alternatively, the rotational barrel 13 can be supported on the stationary barrel 11 so as to be able to rotate freely about.the optical axis O without moving in the optical axis direction relative to the stationary barrel 11.

The zoom lens is further provided with a linear guide barrel 16 (L) a first cam barrel 17 (RL) and a second cam barrel 18 (RL) The first cam barrel 17 is fitted on the linear guide barrel 16 to be rotatable about the optical axis O relative to the linear guide barrel 16 and to be immovable in the optical axis direction relative to the linear guide barrel 16. The second cam barrel 18 is fitted on the front end of the first cam barrel 17 to be rotatable together with the first cam barrel 17 about the optical axis O and also to be movable in the optical axis direction relative to the first cam barrel 17. The linear guide barrel 16, the first cam barrel 17 and the second cam barrel 18 are assembled in advance as a unit, and the rear of this barrel unit is positioned in the stationary barrel 11. The linear guide barrel 16 is provided at the rear end thereof with an outer flange 16a. A linear guide ring (flange ring) 19(L) is fixed to the front end of the linear guide barrel 16 via a retainer ring 20(L). The first cam barrel 17 is held between the outer flange 16a and the linear guide ring 19, and is rotatable about the optical axis O relative to the linear guide barrel 16 and also movable together with the linear guide barrel 16 in the optical axis direction.

The second cam ring 18, which is fitted on the front end of the first cam barrel 17, is provided at the rear end thereof with three linear guide portions 18a (only two are shown in FIG. 1) at 120° intervals about the axis of the second cam ring 18. Each of the three linear guide portions 18a is provided with a spring holding groove 18a1, and a pair of guide grooves 18a2 positioned on the opposite sides of the spring holding groove 18a1 in a circumferential direction of the second cam ring 18 (see FIGS. 8 and 9). Each of the three linear guide portions 18a is further provided, in each spring holding groove 18a1 at the front end (the left end as viewed in FIG. 8 or 9) of each spring holding groove 18a1, with an engaging projection 18a3. All of the spring holding grooves 18a1 and the pairs of guide grooves 18a2 extend parallel to the optical axis O. The first cam barrel 17 is provided on an outer peripheral surface thereof with three stopper portions 17a (only two are shown in FIG. 1) at 120° intervals about the axis of the first cam barrel 17. Each of the three stopper portions 17a is provided with a stopper projection 17a1, and a pair of guide projections 17a2 positioned on the opposite sides of the stopper projection 17a1 in a circumferential direction of the first cam barrel 17 (see FIG. 4). Each pair of guide projections 17a2 of the first cam barrel 17 are respectively fitted in the corresponding pair of guide grooves 18a2 of the second cam ring 18 to be slidable in the optical axis direction relative to the second cam ring 18, with a compression spring 21 being held between each engaging projection 18a3 and the corresponding stopper projection 17a1. Due to this structure, the second cam barrel 18 can slide on the first cam barrel 17 in the optical axis direction without rotating about the optical axis O relative to the first cam barrel 17. The compression springs 21 constantly bias the second cam barrel 18 toward the front of the zoom lens, so that the front end of the second cam barrel 18 is usually in press-contact with the linear guide ring 19. The second cam barrel 18 can move rearward, toward the rear of the zoom lens, against the spring force of the compression springs 21 by an amount of movement corresponding to a predetermined clearance in the optical axis direction between the guide grooves 18a2 and the guide projections 17a2. The second cam barrel 18 can also be slightly inclined with respect to the first cam barrel 17 (i.e., with respect to the optical axis O) by an amount of inclination corresponding to a predetermined clearance in a radial direction between the inner peripheral surface of the second cam barrel 18 and the corresponding outer peripheral surface of the first cam barrel 17.

The first cam barrel 17 is provided on an outer peripheral surface thereof with a male helicoid (male helicoidal thread) 17b that is engaged with the female helicoid 11b of the stationary barrel 11, and three rotation transmission grooves 17c that extend parallel to the optical axis O. The three rotation transmission grooves 17c are formed so as to cut across the male helicoid 17b. The three rotation transmission grooves 17c are formed at 120° intervals about the axis of the first cam barrel 17. The three inward projections 13c of the rotational barrel 13 are respectively engaged with the three rotation transmission grooves 17c to be relatively slidable to each other. The linear guide barrel 16 is provided on the outer flange 16a thereof with three linear guide projections 16b at 120° intervals about the axis of the linear guide barrel 16. Each linear guide projection 16b extends radially outwards to be engaged with the corresponding linear guide groove 11c of the stationary barrel 11. The linear guide barrel 16 is further provided with three linear guide slots (linear guide through-slots) 16c at 120° intervals about the axis of the linear guide barrel 16 so that the circumferential positions of the three linear guide slots 16c coincide with those of the three linear guide projections 16b. Each of the three linear guide slots 16c penetrates the linear guide barrel 16 radially and extends parallel to the optical axis O.

Figure 4:
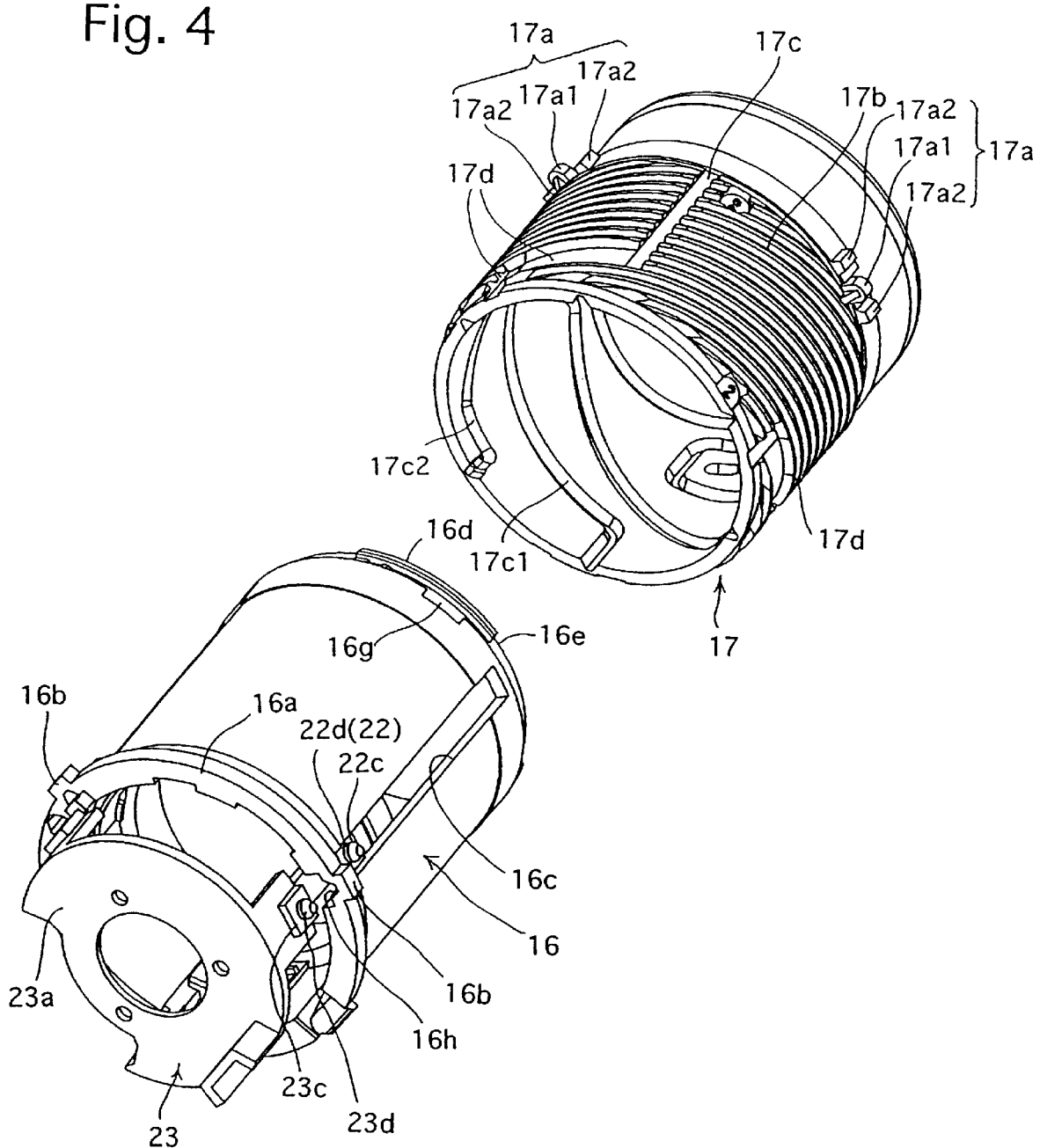
FIG. 4 is an exploded perspective view of the first cam barrel shown in FIG. 3, a linear guide barrel, a first lens frame and a second lens frame.
Figure 5:
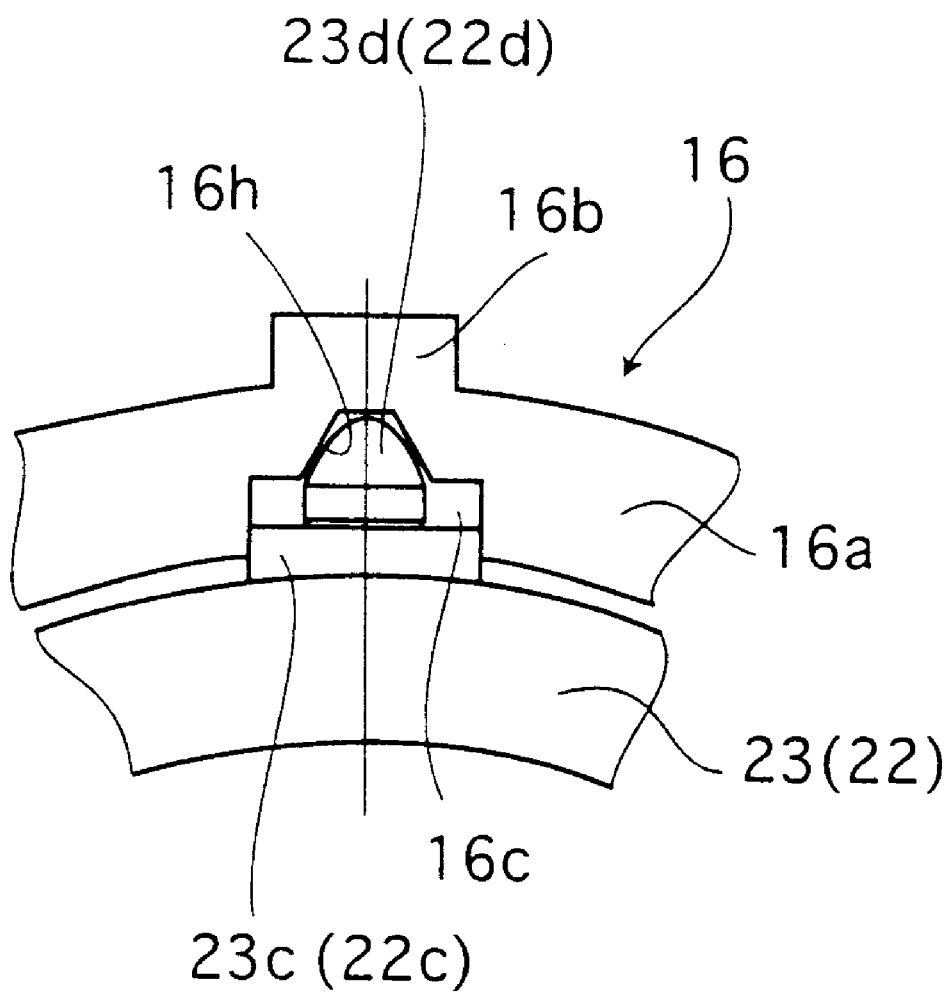
FIG. 5 is a fragmentary rear view of the linear guide barrel and the first lens frame, showing the periphery of an insertion groove of the linear guide barrel.
Figure 6:
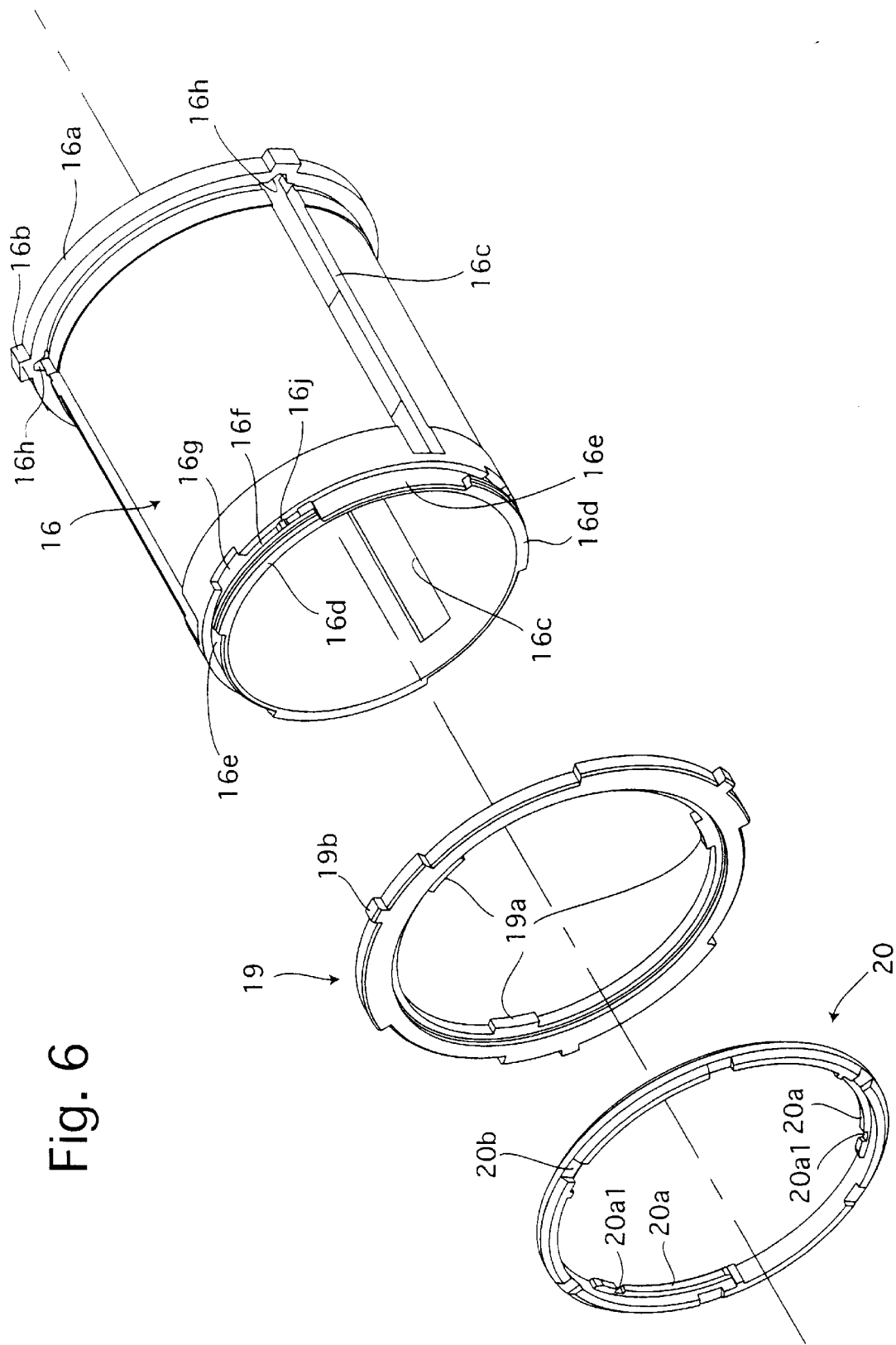
FIG. 6 is an exploded perspective view of the linear guide barrel, a linear guide ring and a retainer ring.

As can be seen in FIGS. 4, 5 and 6, each of the three linear guide slots 16c opens at the rear end of the linear guide barrel 16, and the rear end of each linear guide slot 16c is covered by the corresponding part of the outer flange 16a and the corresponding linear guide projection 16b at the radially outer side of the linear guide barrel 16. The outer flange 16a is provided with three insertion grooves 16h which respectively extend along a portion of each three linear guide slots 16c from the front end of the outer flange 16a to each respective rear end of the three linear guide slots 16c (i.e., the rear end of the outer flange 16a), so that a follower pin (cam follower) 22d and a follower pin (cam follower) 23d can be inserted into each linear guide slot 16c from the corresponding insertion groove 16h.

When the barrel unit which includes the linear guide barrel 16, the first cam barrel 17 and the second cam barrel 18 is coupled to the stationary barrel 11 and the rotational barrel 13, each of the three linear guide projections 16b of the linear guide barrel 16 is inserted into the corresponding linear guide groove 11c of the stationary barrel 11 via a corresponding introducing groove 11d formed on an inner peripheral surface of the stationary barrel 11, and each of the three inward projections 13c of the rotational barrel 13 is inserted into the corresponding rotation transmission groove 17c of the first cam barrel 17 via a corresponding introducing groove 17d formed on an outer peripheral surface of the first cam barrel 17. After each linear guide projection 16b and each inward projection 13c are inserted into the corresponding linear guide groove 11c and the corresponding rotation transmission groove 17c, respectively, the female helicoid 11b of the stationary barrel 11 and the male helicoid 17b of the first cam barrel 17 mesh with each other.

FIG. 2 shows a state where the barrel unit, which includes the linear guide barrel 16, the first cam barrel 17 and the second cam barrel 18, has been coupled to the stationary barrel 11 and the rotational barrel 13. In this state, rotating the rotational barrel 13 about the optical axis O via the gear 13b causes the rotational barrel 13 to move in the optical axis direction while rotating about the optical axis O due to the engagement of the fine female thread 13a with the fine male thread 11a. At the same time, the rotation of the rotational barrel 13 is transmitted to the first cam barrel 17 and the second cam barrel 18, which is fitted on the first cam barrel 17, due to the engagement of the inward projections 13c with the rotation transmission grooves 17c, so that the first cam barrel 17 and the second cam barrel 18 rotate about the optical axis O. At this time, the first cam barrel 17 and the second cam barrel 18 also move in the optical axis direction 0 due to the engagement of the male helicoid 17b with the female helicoid 11b. Furthermore, the linear guide barrel 16 moves in the optical axis direction without rotating about the optical axis O due to the engagement of the linear guide projections 16b with the linear guide grooves 11c, and at the same time the first and second cam barrels 17 and 18, which rotate about the optical axis O relative to the linear guide barrel 16, move together with the linear guide barrel 16 in the optical axis direction.

Figure 3:
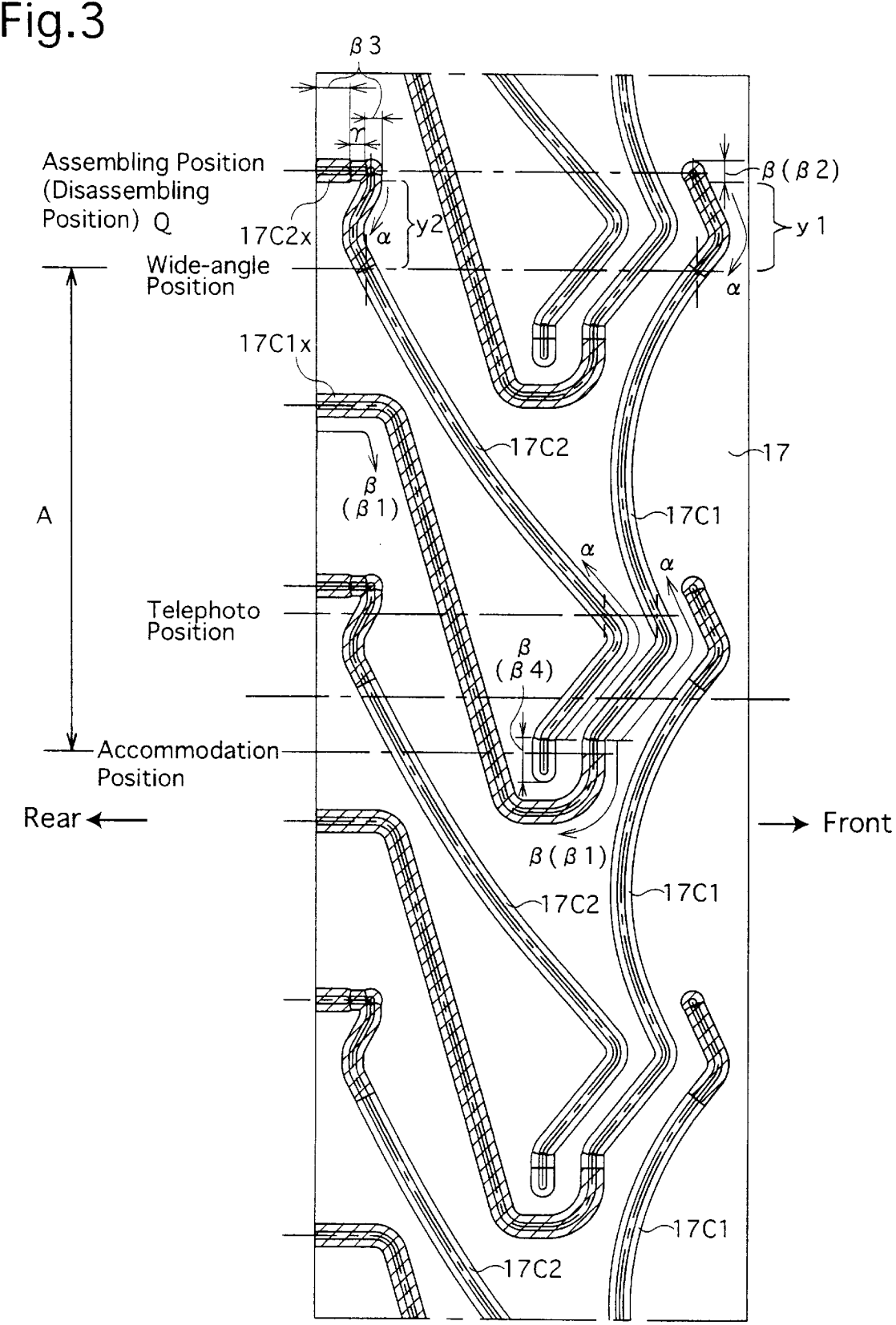
FIG. 3 is a developed view of the inner peripheral surface of a first cam barrel, showing the profiles of first and second cam grooves formed on the inner peripheral surface of the first cam barrel.

The first cam barrel 17 is provided on an inner peripheral surface thereof with three first cam grooves (bottomed cam grooves) 17C1 for driving the first lens group L1, and three second cam grooves (bottomed cam grooves) 17C2 for driving the second lens group L2. FIG. 3 is a developed view of the inner peripheral surface of the first cam barrel 17, showing the contours (profiles) of the first and second cam grooves 17C1 and 17C2. The three first cam grooves 17C1 are formed on the inner peripheral surface of the first cam barrel 17 at 120° intervals about the axis of the first cam barrel 17. Likewise, the three second cam grooves 17C2 are formed on the inner peripheral surface of the first cam barrel 17 at 120° intervals about the axis of the first cam barrel 17 Each of the first and second cam grooves 17C1 and 17C2 has three predetermined positions: an accommodation position, a telephoto position and a wide-angle, in this order along the direction of rotation of the first cam barrel 17 (the vertical direction as viewed in FIG. 3). The telephoto position shown in FIG. 3 of each cam groove 17C1 and 17C2 determines the telephoto extremity of the corresponding lens groups L1 and L2, respectively; the wide-angle position of each cam groove 17C1 and 17C2 determines the wide-angle extremity of the corresponding lens groups L1 and L2, respectively; and the accommodation position of each cam groove 17C1 and 17C2 determines the position of the corresponding lens groups L1 and L2, respectively, when the power of the digital camera is turned OFF. The angle of rotation from the accommodation position to the wide-angle extremity position is shown by "A" in FIG. 3.

The zoom lens is provided with a first lens frame 22(L) and a second lens frame 23(L) which support the first lens group L1 and the second lens group L2, respectively. The first lens frame 22 is guided by the first cam grooves 17C1 and the linear guide slots 16c to be movable in the optical axis direction without rotating about the optical axis O. Likewise, the second lens frame 23 is guided by the second cam grooves 17C2 and the linear guide slots 16c to be movable in the optical axis direction without rotating about the optical axis O. The first lens frame 22 is provided with three resilient extending pieces (resilient supports) 22b which extend rearward from a cylindrical portion 22a of the first lens frame 22. The three resilient extending pieces 22b are formed on the first lens frame 22 at 120° intervals about the axis of the first lens frame 22. Each resilient extending piece 22b is provided on a radially outer surface thereof with a square projection 22c which extends radially outwards to be fitted in the corresponding linear guide slot 16c in a slidable manner in the optical axis direction. Each resilient extending piece 22b is further provided on top of each square projection 22c with the follower pin 22d, which is fixed to the resilient extending piece 22b to extend radially outwards. Each square projection 22c is formed so that the opposite faces thereof, which are respectively in sliding contact with the side faces of the corresponding linear guide slot 16c, extend parallel to each other. The zoom lens is provided with a first lens holder 22e which encloses the first lens group L1 to hold the same. The first lens holder 22e is fixed to the cylindrical portion 22a of the first lens frame 22 via male and female threads 22f which are formed on an outer peripheral surface of the first lens holder 22e and an inner peripheral surface of the cylindrical portion 22a, respectively. The position of the first lens group L1 relative to the first lens frame 22 in the optical axis direction can be adjusted by varying the amount of engagement between the male and female threads 22f. A wave washer 22h is held between the holder 22e and an inner flange 22g of the first lens frame 22 to remove the play between the first lens holder 22e (or the first lens group L1) and the first lens frame 22 (see FIG. 2).

The second lens frame 23 is provided with three resilient extending pieces (resilient supports) 23b which extend forward from an annular plate portion 23a of the second lens frame 23. The three resilient extending pieces 23b are formed on the second lens frame 23 at 120° intervals about the axis of the second lens frame 23. Each resilient extending piece 23b is provided on a radially outer surface thereof with a square projection 23c which extends radially outwards to be fitted in the corresponding linear guide slot 16c in a slidable manner in the optical axis direction. Each resilient extending piece 23b is further provided on top of each square projection 23c with the aforementioned follower pin 23d, which is fixed to the resilient extending piece 23b to extend radially outwards. The square projections 23c and the follower pins 23d of the second lens frame 23 are identical to the square projections 22c and the follower pins 22d of the first lens frame 22 except that the resilient extending pieces 23b of the second lens frame 23 extend in the direction opposite to the resilient extending pieces 22b of the first lens frame 22 in the optical axis direction. The zoom lens is provided with a second lens holder 23e which encloses the second lens group L2 to hold the same. The second lens holder 23e is fixed to the annular plate portion 23a of the second lens frame 23 via set screws 23f A shutter block 24 is provided around the second lens group L2. The shutter block 24 is fixed to the annular plate portion 23a of the second lens frame 23 via the set screws 23f that are screwed into the rear of the shutter block 24. The shutter block 24 functions to interrupt light bundles which are incident on the CCD 12a at a shutter release operation.

Each of the first and second lens frames 22 and 23 is guided linearly in the optical axis direction without rotating about the optical axis O by the engagement of each of the three square projections 22c and corresponding each of the three square projections 23c with each common corresponding linear guide slot of the three linear guide slots 16c. Each follower pin 22d penetrates the corresponding linear guide slot 16c of the linear guide barrel 16 to be engaged with the corresponding first cam groove 17C1 of the first cam barrel 17, which is fitted on the linear guide barrel 16 to be rotatable about the optical axis relative to linear guide barrel 16. Likewise, each follower pin 23d penetrates the corresponding linear guide slot 16c of the linear guide barrel 16 to be engaged with the corresponding second cam groove 17C2 of the first cam barrel 17. When the first and second lens frames 22 and 23 are placed in the linear guide barrel 16 and the first cam barrel 17, firstly each of the three square projections 22c and corresponding one of the three square projections 23c are inserted into a corresponding linear guide slot of the three linear guide slots 16c from the rear end face of the linear guide barrel 16. At the same time, each of the three follower pins 22d and corresponding one of the three follower pins 23d are inserted into corresponding one of the three insertion grooves 16h to be fitted in the corresponding first and second cam grooves 17C1 and 17C2, respectively. It should be noted that the hatched areas of the first and second cam grooves 17C1 and 17c2 in FIG. 3 are used solely for the purpose of inserting each follower pin 22d or 23d into the corresponding cam groove 17C1 or 17C2 during assembly or removing each follower pin 22d or 23d from the corresponding cam groove 17C1 or 17C2 during disassembly, and thus are not used when the zoom lens is in operation.

According to the above described guide structure, rotating the rotational barrel 13 about the optical axis O causes the barrel unit which includes the linear guide barrel 16, the first cam barrel 17 and the second cam barrel 18 to move in the optical axis direction. During this movement of the barrel unit, the first and second cam barrels 17 and 18 rotate together about the optical axis O; but the linear guide barrel 16 does not rotate about the optical axis O. As a result, the first lens frame 22 (the first lens group L1) and the second lens frame 23 (the second lens group L2) linearly move in the optical axis direction while changing the space therebetween in accordance with the contours of the first and second cam grooves 17C1 and 17C2 to thereby carry out a zooming operation.

Figure 7:
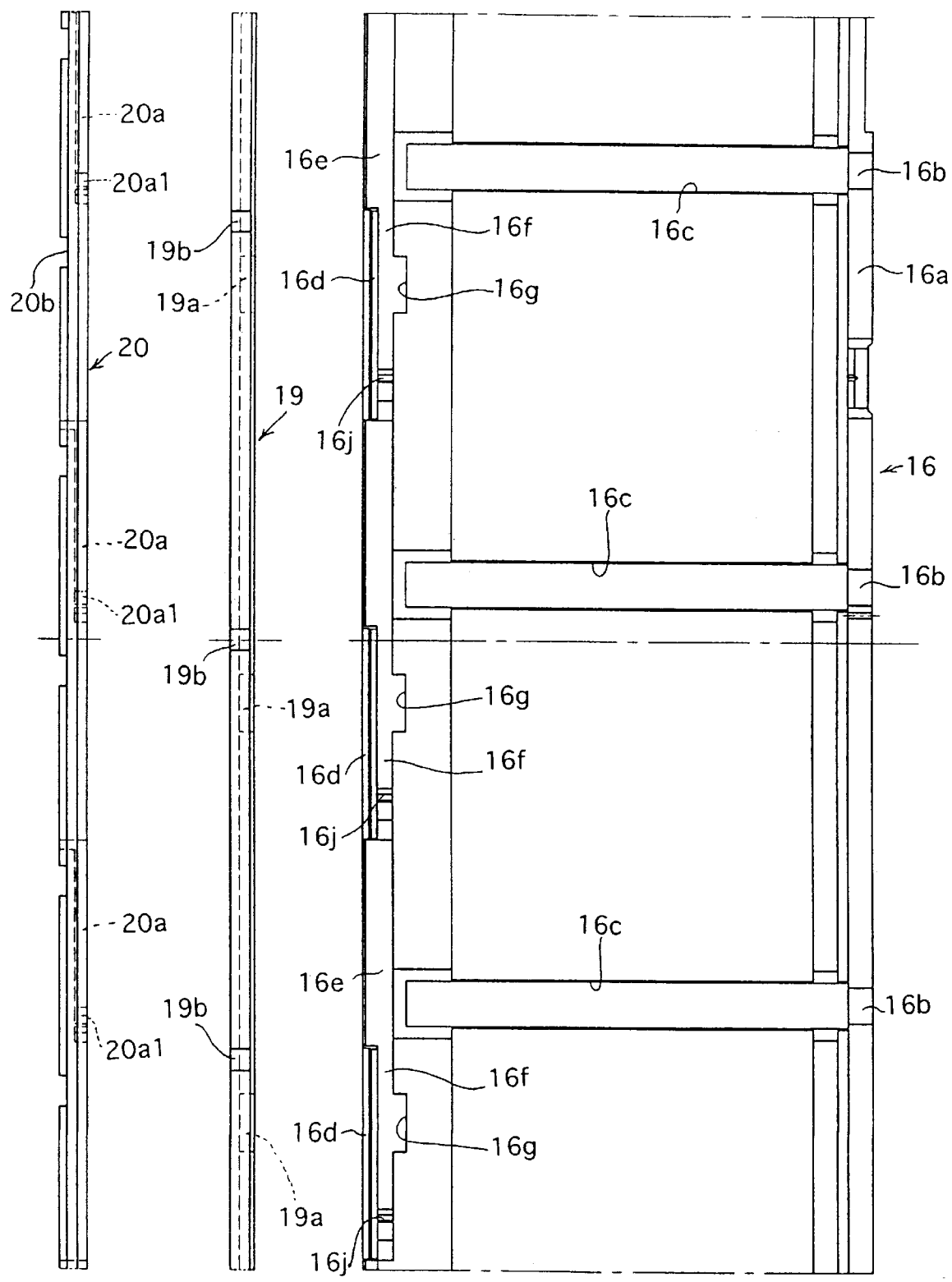
FIG. 7 is a developed view of the linear guide barrel, the linear guide ring and the retainer ring.

The coupling structure of the linear guide ring 19 and the retainer ring 20 to the front end of the linear guide barrel 16 will be hereinafter discussed with reference to FIGS. 6 and 7. The linear guide barrel 16 is provided, at the front end thereof at 120° intervals about the axis of the linear guide barrel 16, with three engaging lugs 16d each of which extends radially outwards A receiving area 16e is formed between any two adjacent engaging lugs 16d of the linear guide barrel 16 in order to receive one of three radially inward projections 19a of the linear guide ring 19. The linear guide barrel 16 is provided immediately behind the three engaging lugs 16d with three grooves 16f, respectively. The radius of the linear guide barrel 16 from the axis of the linear guide barrel 16 to the bottom surface of each groove 16f is identical to the radius from the axis of the linear guide barrel 16 to the surface of each receiving area 16e. The linear guide barrel 16 is provided behind the three engaging lugs 16d with three recesses 16g, respectively, each of which is connected with the corresponding groove 16f. Each recess 16g is recessed rearward (toward the right as viewed in FIG. 7) in the direction parallel to the optical axis O, i.e., in the optical axis direction.

On the other hand, the linear guide ring 19 is provided with the aforementioned three inward projections 19a at 120° intervals about the axis of the linear guide ring 19. The three inward projections 19a can be inserted into the three receiving areas 16e, respectively. If the linear guide ring 19 is rotated about the axis thereof clockwise as viewed in FIG. 6 relative to the linear guide barrel 16 with the three inward projections 19a being properly inserted into the three receiving areas 16e, respectively, each inward projection 19a slides into the corresponding groove 16f. The linear guide ring 19 is provided with three radially outward projections 19b at 120° intervals about the axis of the linear guide ring 19. The circumferential positions of the three outward projections 19b are precisely determined with reference to the circumferential positions of the three inward projections 19a.

The retainer ring 20 is provided with radially inward blades 20a at 120° intervals about the axis of the retainer ring 20. The three inward blades 20a can be inserted into the three receiving areas 16e of the linear guide barrel 16, respectively. If the retainer ring 20 is rotated about the axis thereof clockwise as viewed in FIG. 6 relative to the linear guide barrel 16 with the three inward blades 20a being properly inserted into the three receiving areas 16e, respectively, each inward blade 20a slides into the corresponding groove 16f. The retainer ring 20 is provided on the front end face thereof with a plurality of grooves 20b which are recessed rearward, toward the linear guide barrel 16, so that a pin face wrench (not shown) can be engaged with the recessed portions 20b to rotate the retainer ring 20 relative to the linear guide barrel 16.

When the linear guide ring 19 is fixed to the front end of the linear guide barrel 16, firstly the three inward projections 19a are respectively inserted into the three receiving areas 16e, and then the linear guide ring 19 is rotated about the axis thereof clockwise as viewed in FIG. 6 relative to the linear guide barrel 16 so that each inward projection 19a slides into the corresponding groove 16f. Subsequently, each inward projection 19a is made to be fitted in the corresponding recess 16g. This engagement of each inward projection 19a with the corresponding recess 16g determines the fixed circumferential position of the linear guide ring 19 relative to the linear guide barrel 16 Subsequently, the inward blades 20a of the retainer ring 20 are respectively inserted into the three receiving areas 16e, and then the retainer ring 20 is rotated about the axis thereof clockwise as viewed in FIG. 6 relative to the linear guide barrel 16 so that each inward blade 20a slides into the corresponding groove 16f and presses the corresponding inward projection 19a into the corresponding recess 16g. This prevents the linear guide ring 19 from moving in the optical axis direction relative to the linear guide barrel 16. In this state, since each of the three inward blades 20a of the retainer ring 20 is held in one of the three grooves 16f between the corresponding engaging lug 16d and the corresponding inward projection 19a, the inward blades 20a and the engaging lugs 16d function to prevent the linear guide ring 19 from coming off the front end of the linear guide barrel 16. Between the linear guide barrel 16 and the retainer ring 20 is provided a click-stop device which prevents the retainer ring 20 from rotating counterclockwise as viewed in FIG. 6 so that the retainer ring 20 cannot come off the front end of the linear guide barrel 16 after the retainer ring 20 is properly engaged with the linear guide barrel 16. Three indentations 20a1 which are formed on the retainer ring 20 and corresponding three detent 16j which are formed on the linear guide barrel 16 to be respectively engaged with the three indentations 20a1 constitute the elements of the click-stop device (see FIGS. 6 and 7).

Accordingly, the outward projections 19b of the linear guide ring 19 that is fixed to the front end of the linear guide barrel 16 in the above described manner are located at predetermined specific positions (angular positions) relative to the linear guide projections 16b. The zoom lens is provided at the front thereof with an external barrel (a hood barrel) 25(L). The external barrel 25 is provided, on an inner peripheral surface thereof at 120° intervals about the axis of the external barrel 25, with three linear guide grooves 25a which extend parallel to the optical axis O. The three outward projections 19b of the linear guide ring 19 are respectively engaged with the three linear guide grooves 25a to guide the external barrel 25 to move in the optical axis direction without rotating about the optical axis O. The external barrel 25 is provided at the rear end thereof with three radially inward pins 25b which are respectively engaged with three guide grooves 18b formed on outer peripheral surface of the second cam barrel 18 at 120° intervals about the axis thereof.

Figure 8:
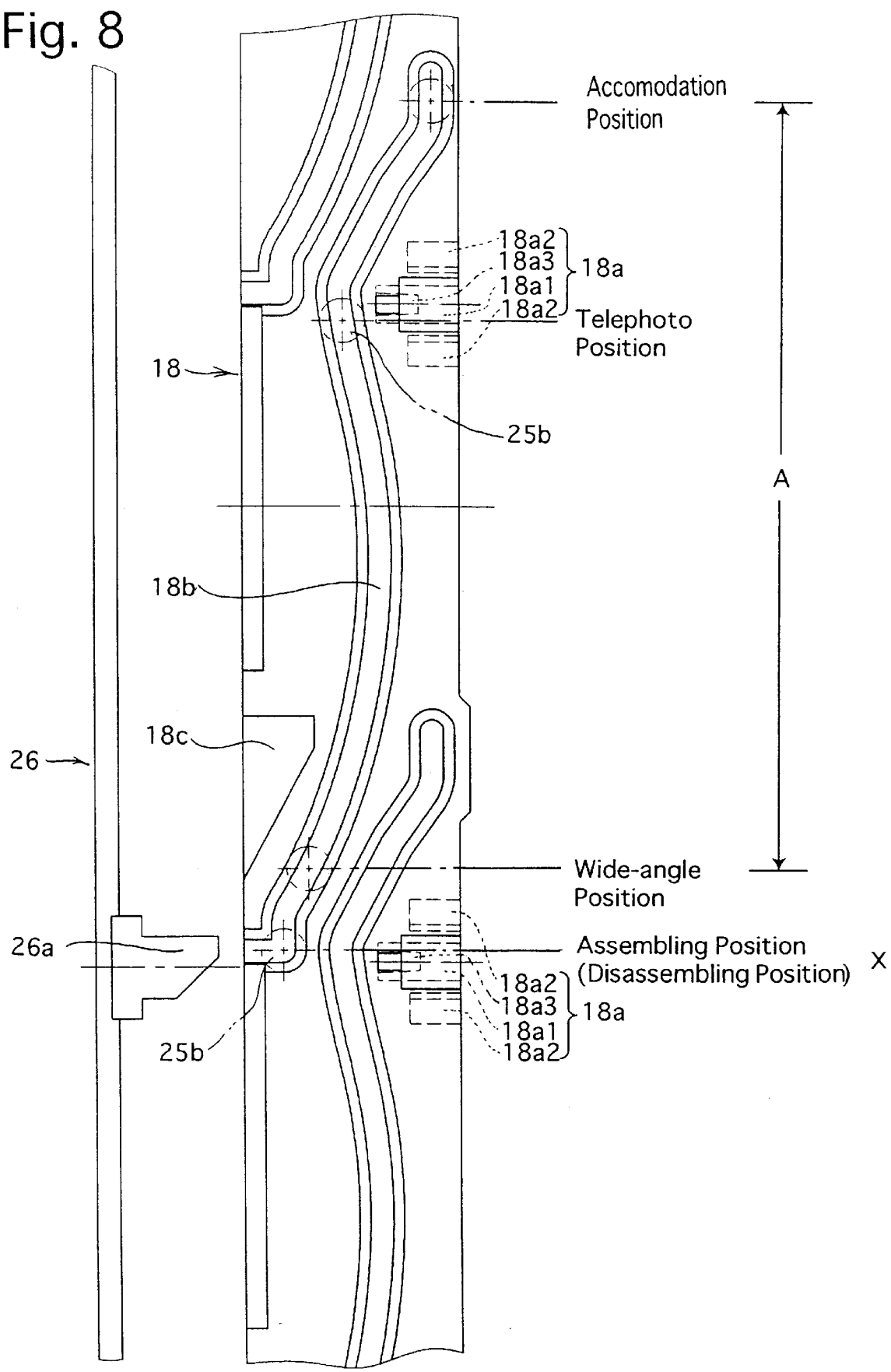
FIG. 8 is a developed view of a second cam barrel and a barrier drive ring, showing the positional relationship therebetween when the zoom lens is set at the telephoto extremity thereof (when the zoom lens is in a ready-to-photograph state)
Figure 9:
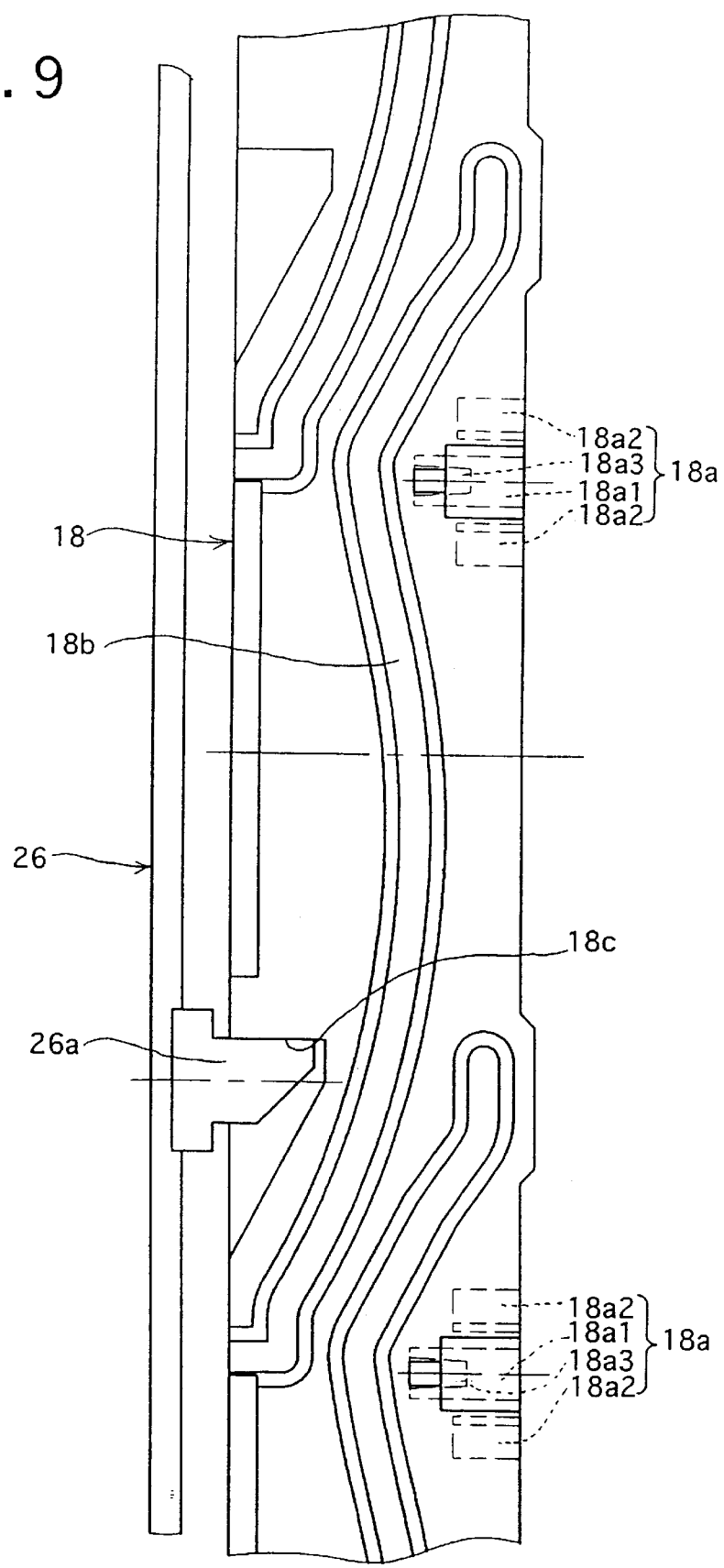
FIG. 9 is a developed view of the second cam barrel and the barrier drive ring, showing the positional relationship therebetween when the zoom lens is positioned in the accommodation position (when the power of the zoom lens is turned OFF)

As shown in FIGS. 8 and 9, each of the three guide grooves 18b of the second cam barrel 18 defines an assembling position (or a disassembling position) X at which the three inward pins 25b of the external barrel 25 are respectively inserted into or taken out of the three guide grooves 18b of the second cam barrel 18. Each of the three guide grooves 18b further defines an accommodation position, a telephoto position and a wide-angle extremity, which determine the accommodation position, the telephoto extremity and the wide-angle extremity of the first cam barrel 17, respectively. The three guide grooves 18b are formed to move the external barrel 25 in the optical axis direction in accordance with the rotational position of the second cam barrel 18, which rotates together with the first cam barrel 17. More specifically, the three guide grooves 18b are formed to make the external barrel 25 function as a movable lens hood so that the external barrel 25 advances relative to the second cam barrel 18 (i.e., the first lens group L1) when the zoom lens is set at the telephoto extremity thereof having a narrow angle of view while the external barrel 25 retreats relative to the second cam barrel 18 when the zoom lens is set at the wide-angle extremity thereof having a wide angle of view. The external barrel 25 is positioned in the wide-angle extremity thereof and the telephoto extremity thereof in FIG. 10 and FIG. 11, respectively.

If the external barrel 25 is pressed rearward (i.e., toward the camera body) by an external force when the camera is in use, the compression springs 21 function as shock absorbers which can absorb at least part of such an external force since the compression springs 21 are positioned between the first cam barrel 17, which guides the first and second lens groups L1 and L2 in the optical axis direction, and the second cam barrel 18, which guides the external barrel 25 in the optical axis direction. Such an external force is transmitted partly to the first cam barrel 17 after having been absorbed to some extent by the compression springs 21, which prevents large external forces from being applied to the first cam barrel 17. Consequently, the precision of the axial position of each of the first and second lens groups L1 and L2 is influenced negligibly by external forces applied to the external barrel 25. In FIG. 2, the reference numeral 29(F) designates a stationary external barrel which is integral with the camera body. The external barrel 25 advances and retreats with respect to the stationary external barrel 29.

Figure 13:
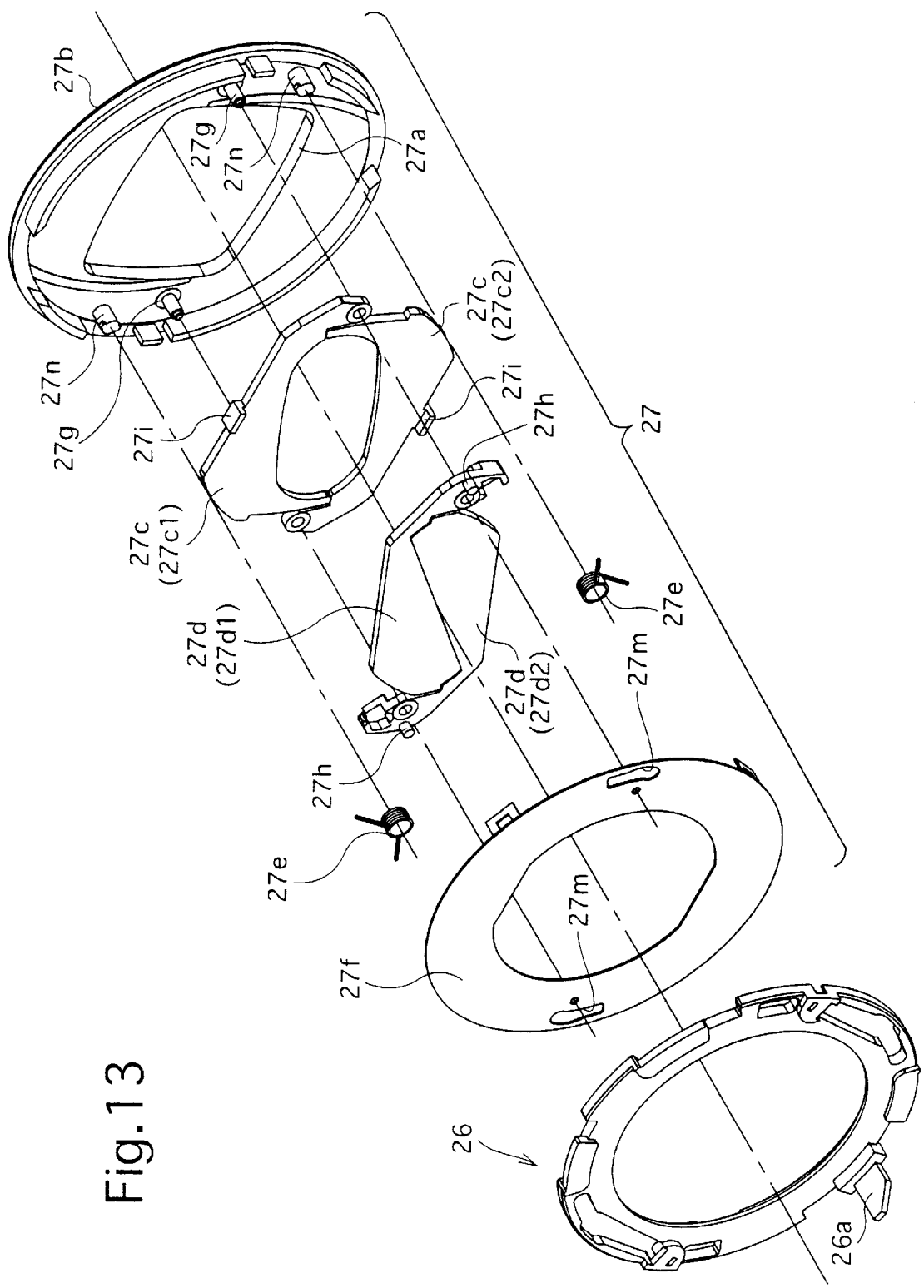
FIG. 13 is an exploded perspective view of the barrier block, viewed from behind the barrier block.
Figure 14:
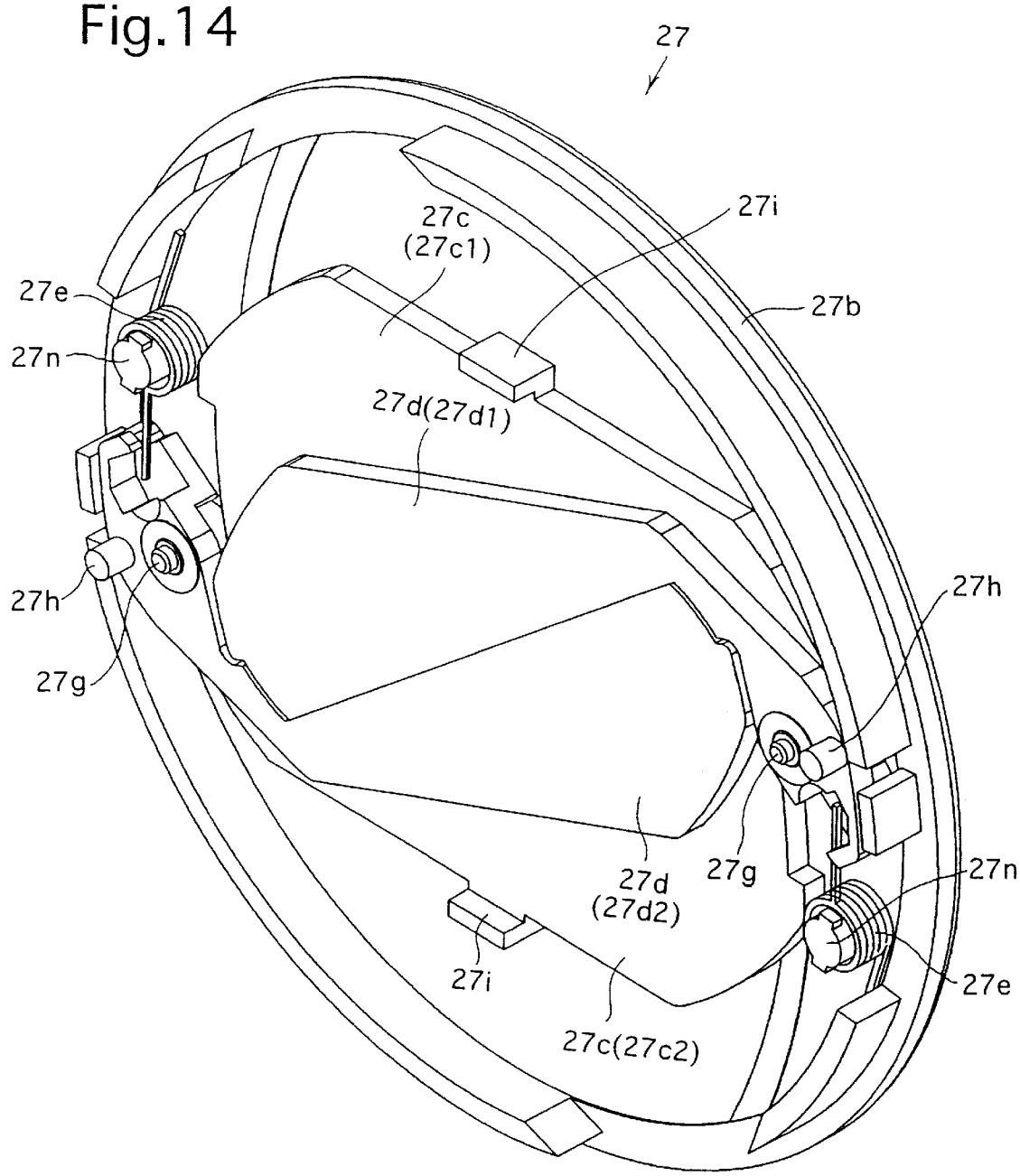
FIG. 14 is a perspective view of the barrier block with an annular pressure plate being removed from the barrier block, viewed from behind the barrier block.
Figure 15A:
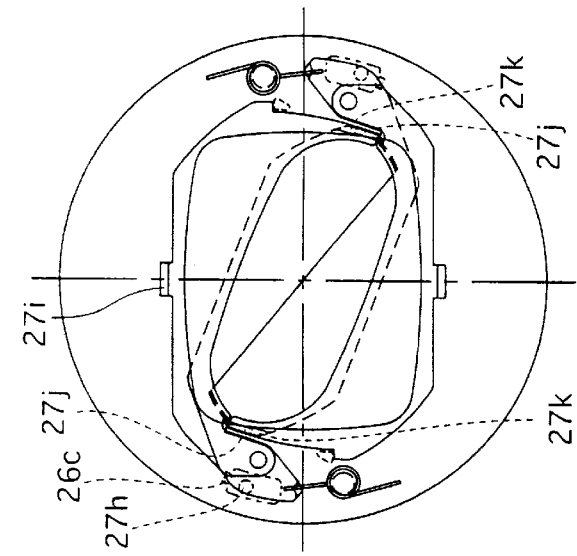
FIG. 15A is a schematic front view of the barrier block, showing two pairs of barrier blades in a fully open position.
Figure 15B:
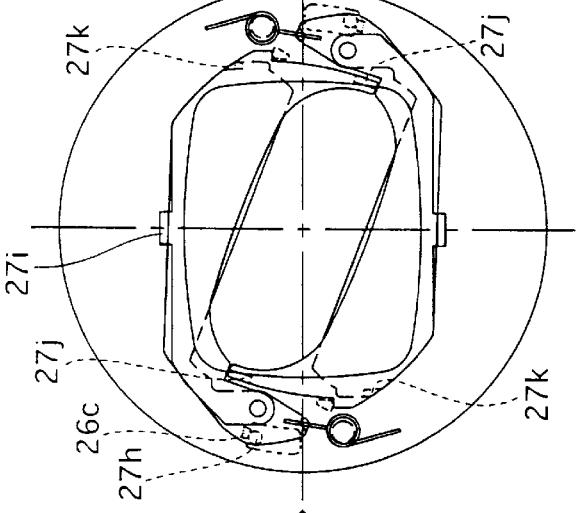
FIG. 15B is a schematic front view of the barrier block, showing the two pairs of barrier blades in a half-closed position.
Figure 15C:
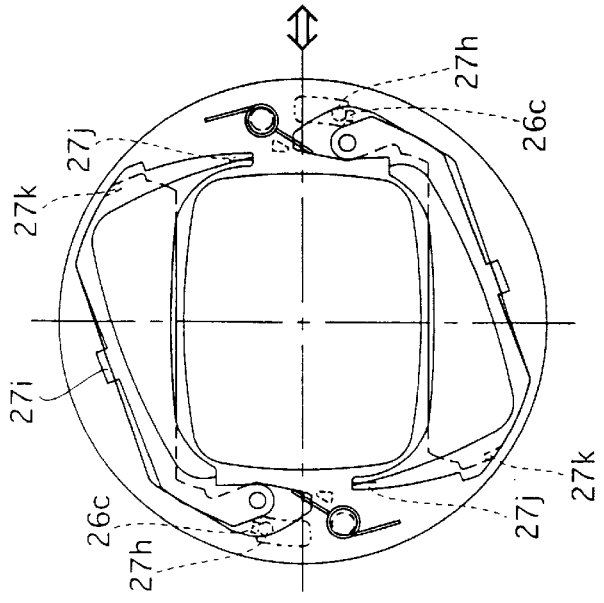
FIG. 15C is a schematic front view of the barrier block, showing the two pairs of barrier blades in a fully closed position.

The external barrel 25 is provided, at the front thereof in the radially inner side of the external barrel 25, with a barrier drive ring 26, so that the barrier drive ring 26 can rotate about the optical axis O The barrier drive ring 26 functions to open and close two pairs of barrier blades 27c and 27d (i.e. the front pair of barrier blades 27c and the rear pair of barrier blades 27d) by rotating about the optical axis O. The two pairs of barrier blades 27c and 27d together function as a lens protection cover for protecting the front surface of the first lens group L1 from getting scratched, etc., when the digital camera is not in use. The barrier block 27 is provided with a panel 27b having a photographic aperture 27a, the aforementioned two pairs of barrier blades 27c and 27d supported by the panel 27b therebehind to open and close the photographic aperture 27a, and two torsion springs 27e which constantly bias the two pairs of barrier blades 27c and 27d in a direction to close the photographic aperture 27a. The barrier block 27 is further provided with an annular pressure plate 27f which holds the two pairs of barrier blades 27c and 27d and the torsion springs 27e between the panel 27b and the pressure plate 27f. The barrier block 27 having such elements is assembled in advance as a unit. The panel 27b is provided on a rear face thereof with two pivots 27g (see FIGS. 13 and 14) and two engaging pins 27n. The upper front barrier blade 27c1 of the front pair of barrier blades 27c and the upper rear barrier blade 27d1 of the rear pair of barrier blades 27d are pivoted at corresponding one of the two pivots 27g (the right pivot 27g as viewed in FIG. 13), while the lower front barrier blade 27c2 of the front pair of barrier blades 27c and the lower rear barrier blade 27d2 of the rear pair of barrier blades 27d are pivoted at the other pivot 279 (the left pivot 27g as viewed in FIG. 13). Each of the rear pair of barrier blades 27d is constantly biased to rotate in a direction to close the photographic aperture 27a of the panel 27b by the corresponding torsion spring 27e whose coil portion is fitted on the corresponding engaging pin 27n. Each of the rear pair of barrier blades 27d is provided in the vicinity of the pivoted portion thereof with a driven pin 27h that is driven to open the corresponding rear barrier blade 27d against the spring force of the corresponding torsion spring 27e. Each of the front pair of barrier blades 27c is provided on an outer edge thereof with an engaging projection 27i which extends rearward to be engaged with the outer edge of the corresponding rear barrier blade 27d so that the engaging projection 27i of each of the front pair of barrier blades 27c comes into engagement with the outer edge of the corresponding rear barrier blade 27d to rotate the corresponding front barrier blade 27c in the direction to open the photographic aperture 27a together with the corresponding rear barrier blade 27d when the corresponding rear barrier blade 27d is driven to rotate in the direction to open the photographic aperture 27a. The upper front barrier blade 27c1 is provided on a rear surface thereof with an engaging projection 27j, while the upper rear barrier blade 27d1 is provided on a front surface thereof with an engaging projection 27k (see FIGS. 15A, 15B and 15C). When the upper rear barrier blade 27d1 is driven to rotate in the direction to close the photographic aperture 27a, the engaging projection 27k of the upper rear barrier blade 27d1 is engaged with the engaging projection 27j of the upper front barrier blade 27c1 to drive the upper front barrier blade 27c1 to rotate in the direction to close the photographic aperture 27a together with the upper rear barrier blade 27d1. Likewise, the lower front barrier blade 27c2 is provided on a rear surface thereof with an engaging projection 27j, while the lower rear barrier blade 27d2 is provided on a front surface thereof with an engaging projection 27k (see FIGS. 15A, 15B and 15C). When the lower rear barrier blade 27d2 is driven to rotate in the direction to close the photographic aperture 27a, the engaging projection 27k of the lower rear barrier blade 27d2 is engaged with the engaging projection 27j of the lower front barrier blade 27c2 to drive the lower front barrier blade 27c2 to rotate in the direction to close the photographic aperture 27a together with the lower rear barrier blade 27d2.

The pressure plate 27f is provided with two slots 27m through which the two drive pins 27h of the rear pair of barrier blades 27d penetrate toward the barrier drive ring 26, respectively.

Figure 16:
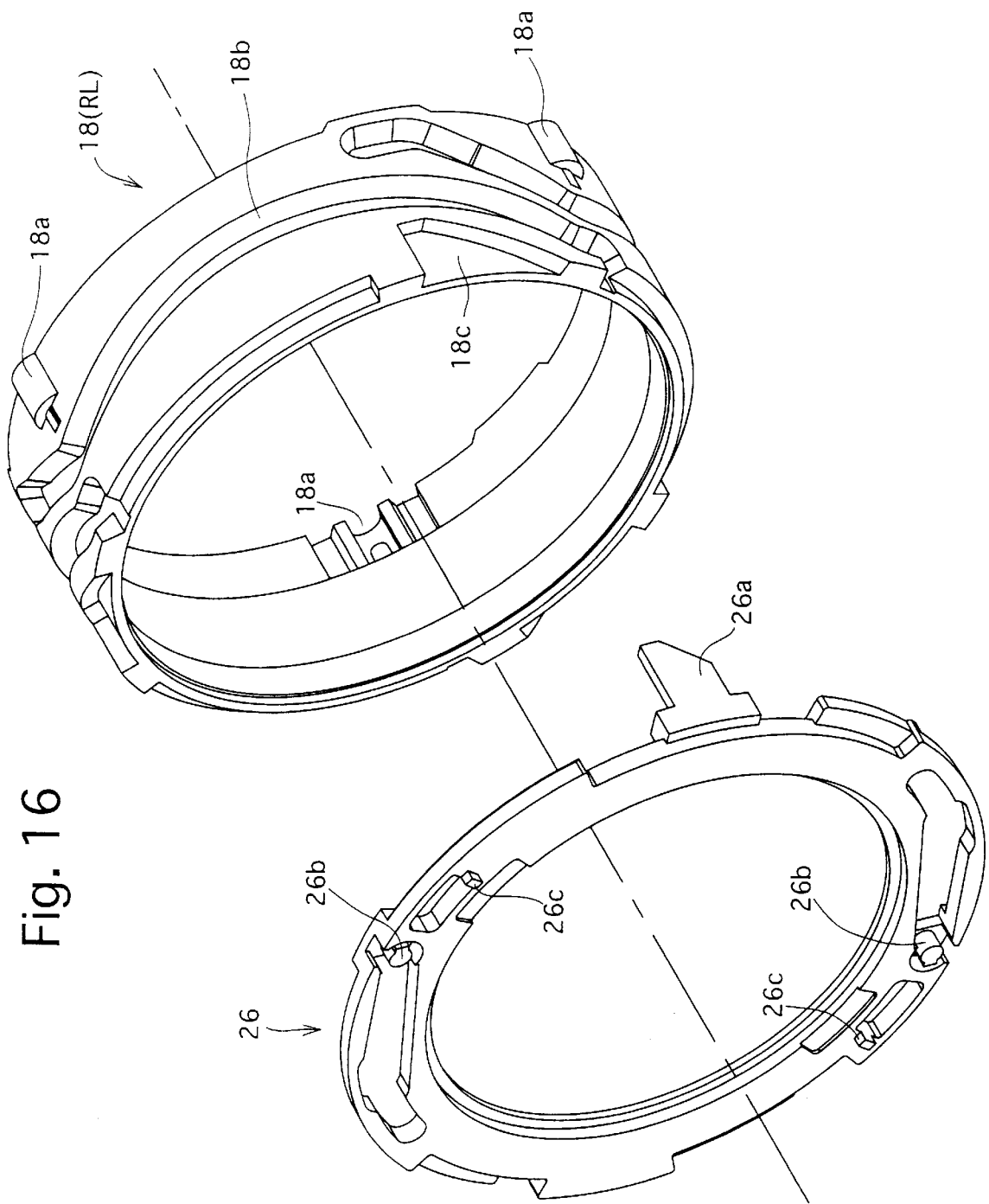
FIG. 16 is a perspective view of the second cam barrel and the barrier drive ring, showing the positional relationship between a driven lever which extends from the barrier drive ring and a rotation transfer recess formed on the second cam barrel.
Figure 17:
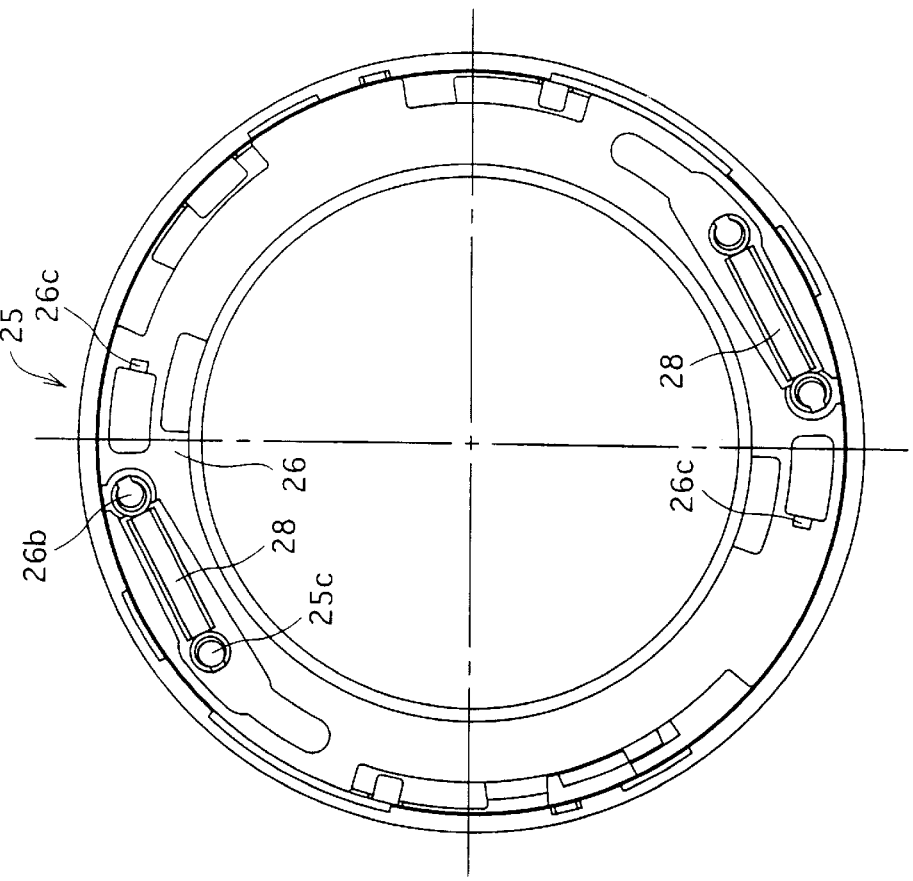
FIG. 17 is a front view of the external barrel that is supported by the external barrel to be freely rotatable about the optical axis, in a state where the barrier drive ring is rotated to one rotational limit thereof to thereby fully close the two pairs of barrier blades.
Figure 18:
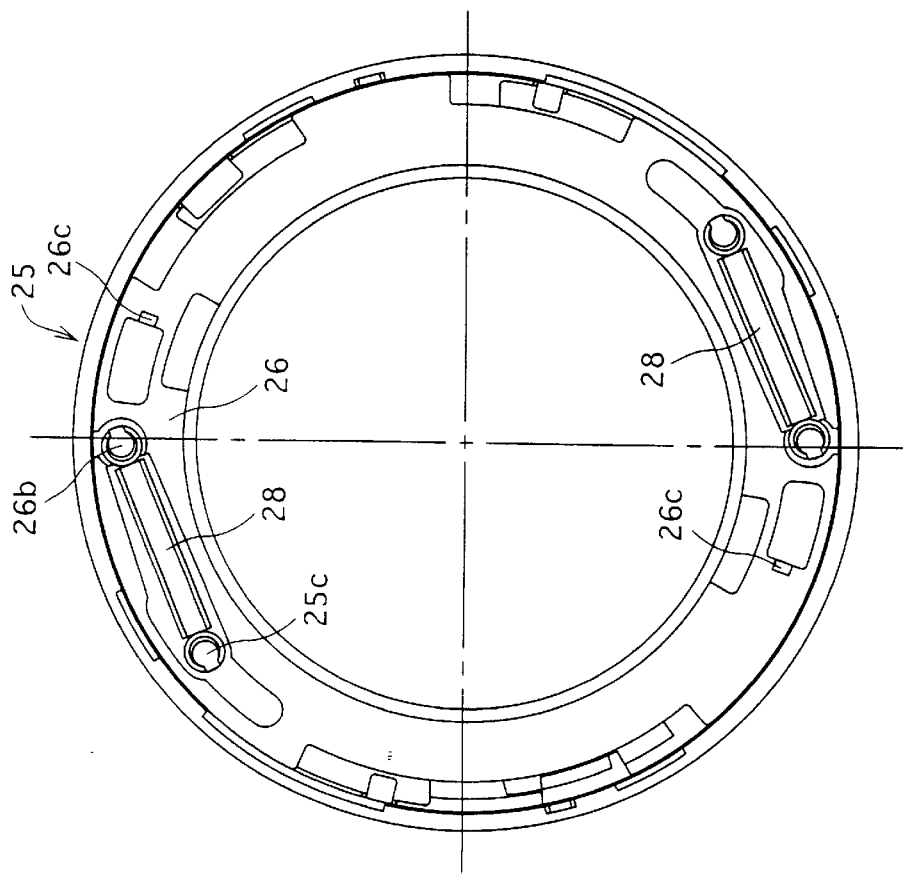
FIG. 18 is a front view of the external barrel shown in FIG. 17, in a state where the barrier drive ring is rotated to the other rotational limit thereof to thereby fully open the two pairs of barrier blades.

The barrier drive ring 26 is provided on the front thereof with two protrusions 26b, while the external barrel 25 is provided in the vicinity of the front end thereof with corresponding two protrusions 25c (see FIGS. 16, 17 and 18). Two helical extension springs 28 are positioned between the external barrel 25 and the barrier drive ring 26 so that one and the other ends of one helical extension spring 28 are hooked on one of the two protrusions 26b and corresponding one of the two protrusions 25c, respectively, and one and the other ends of the other helical extension spring 28 are hooked on the other protrusion 26b and the other protrusion 25c, respectively. The spring force of each helical extension spring 28 is stronger than the spring force of each torsion spring 27e. The barrier drive ring 26 is constantly biased by the two helical extension springs 28 to rotate in the direction to open the two pairs of barrier blades 27c and 27d. The barrier drive ring 26 is provided on the front thereof with two protrusions 26c which can be respectively engaged with the two drive pins 27h of the rear pair of barrier blades 27d to open the two pairs of barrier blades 27c and 27d. When the barrier drive ring 26 is rotated to the rotational limit thereof by the spring force of the helical extension springs 28, each of the two protrusions 26c is engaged with the corresponding driven pin 27h to push the same in the direction to open the corresponding rear barrier blade 27d against the spring force of the corresponding torsion spring 27e, so that the corresponding front barrier blade 27c also opens via the engaging projection 27i thereof (see FIGS. 15A, 15B and 15C).

On the other hand, the barrier drive ring 26 is provided with a driven lever 26a which extends from the rim of the barrier drive ring 26 toward the second cam barrel 18 to be engaged with, and disengaged from, a rotation transfer recess 18c formed on an outer peripheral surface of the second cam barrel 18 (see FIGS. 8, 9 and 16). Since the barrier drive ring 26 is supported by the external barrel 25 to be rotatable about the optical axis O relative to the external barrel 25, but immovable in the optical axis direction relative to the external barrel 25, the barrier drive ring 26 moves toward and away from the rotating second cam barrel 18 if the external barrel 25 linearly moves in the optical axis direction due to the engagement of the inward pins 25b of the external barrel 25 with the guide grooves 18b of the second cam barrel 18 as can be seen in FIGS. 8 and 9. The driven lever 26a and the rotation transfer recess 18c are apart from each other when positioned within a photographing range (i.e., between the telephoto extremity and the wide-angle extremity) as shown in FIG. 8. When the zoom barrel retreats from the telephoto extremity thereof to the accommodation position thereof, the driven lever 26a approaches the rotation transfer recess 18c and is then engaged with the rotation transfer recess 18c to apply a force to the barrier drive ring 26 to rotate the same in the direction to close the two pairs of barrier blades 27c and 27d. When the barrier drive ring 26 rotates to the rotational limit thereof against the spring force of the helical extension springs 28, each of the protrusions 26c of the barrier drive ring 26 disengages from the drive pins 27h of the corresponding rear barrier blade 27d. As a result, each of the rear pair of barrier blades 27d closes by the spring force of the corresponding torsion spring 27e, so that each of the front pair of barrier blades 27c also closes via the corresponding engaging projections 27j and 27k to thereby close the photographic aperture 27a (see FIG. 14). Conversely, when the zoom barrel advances from the accommodation position thereof to the telephoto extremity thereof, the driven lever 26a moves forwards and then disengages from the rotation transfer recess 18c to thereby allow the barrier drive ring 26 to rotate in the direction to open the two pairs of barrier blades 27c and 27d by the spring force of the helical extension springs 28. As a result, each of the protrusions 26c of the barrier drive ring 26 is engaged with the drive pin 27h of the corresponding rear barrier blade 27d to push the same in the direction to open the corresponding front barrier blade 27c via the corresponding engaging projection 27i to thereby open the two pairs of barrier blades 27c and 27d. Accordingly, as can be understood by the above description, the two pairs of barrier blades 27c and 27d are driven to open and close by rotation of the barrier drive ring 26. It should be noted that the barrier drive ring 26 has only one driven lever 26a, whereas the second cam barrel 18 has three rotation transfer recesses 18c formed at 120° intervals about the axis of the second cam barrel 18. One rotation transfer recess 18c which is actually used is freely selected from the three rotation transfer recesses 18c during assembly.

Figure 10:
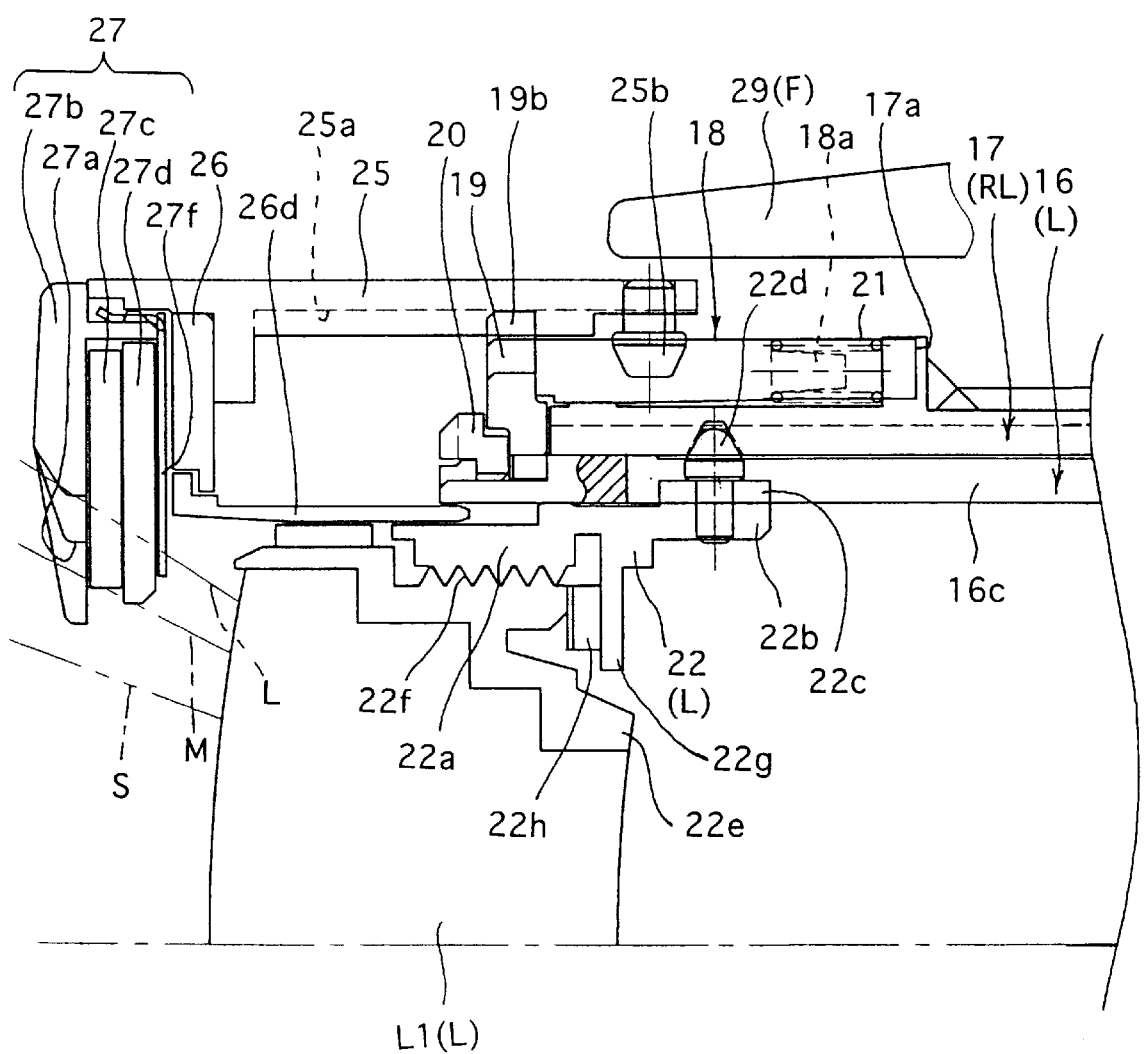
FIG. 10 is an axial cross sectional view of the zoom lens show in FIG. 1, showing the zoom lens above the optical axis thereof, showing the positional relationship between an external barrel and the second cam barrel (a first lens group) when the zoom lens is set at the wide-angle extremity thereof.
Figure 11:
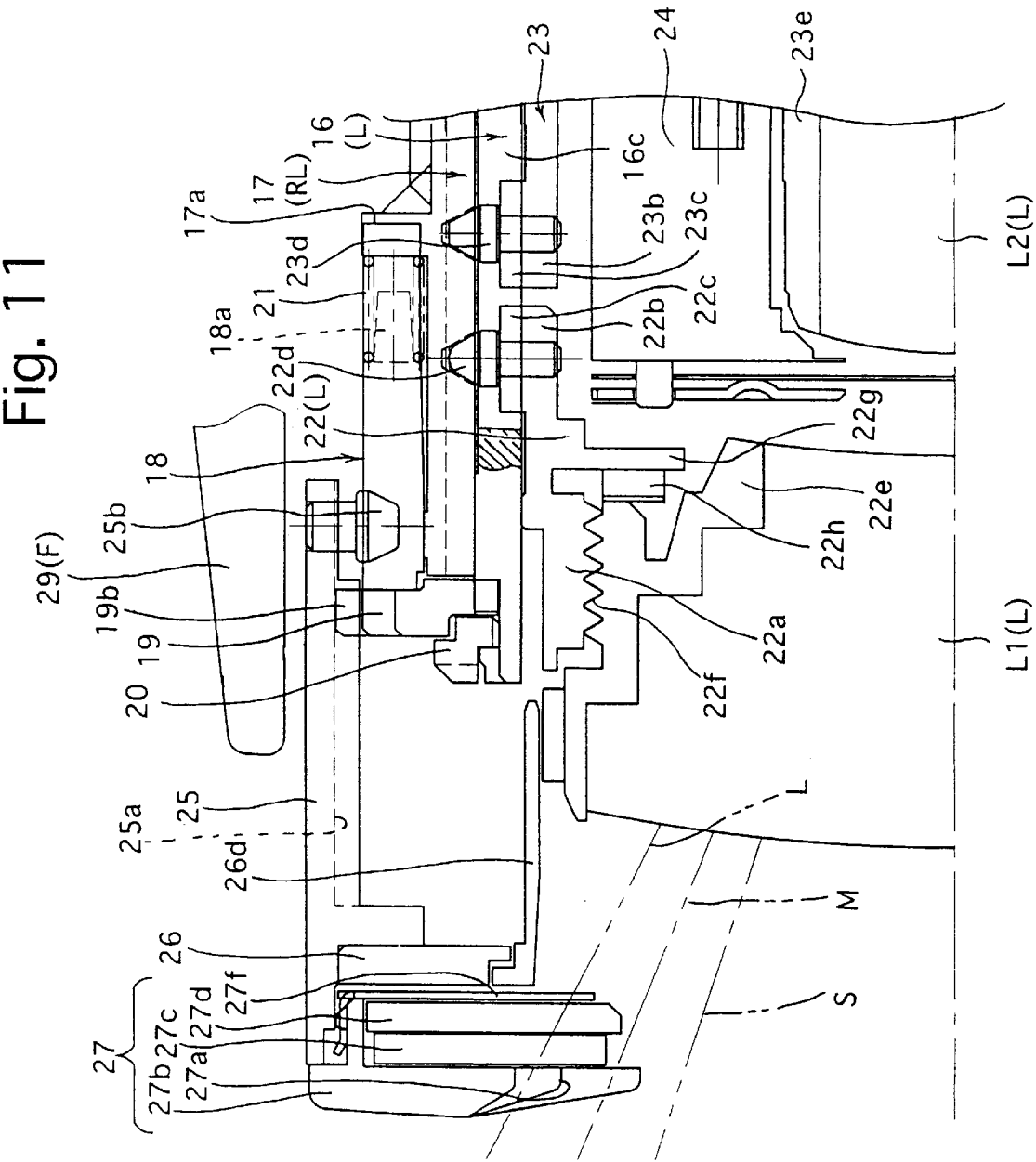
FIG. 11 is an axial cross sectional view of the zoom lens show in FIG. 1, showing the zoom lens above the optical axis thereof, and showing the positional relationship between the external barrel and the second cam barrel (the first lens group) when the zoom lens is set at the telephoto extremity thereof.
Figure 12:
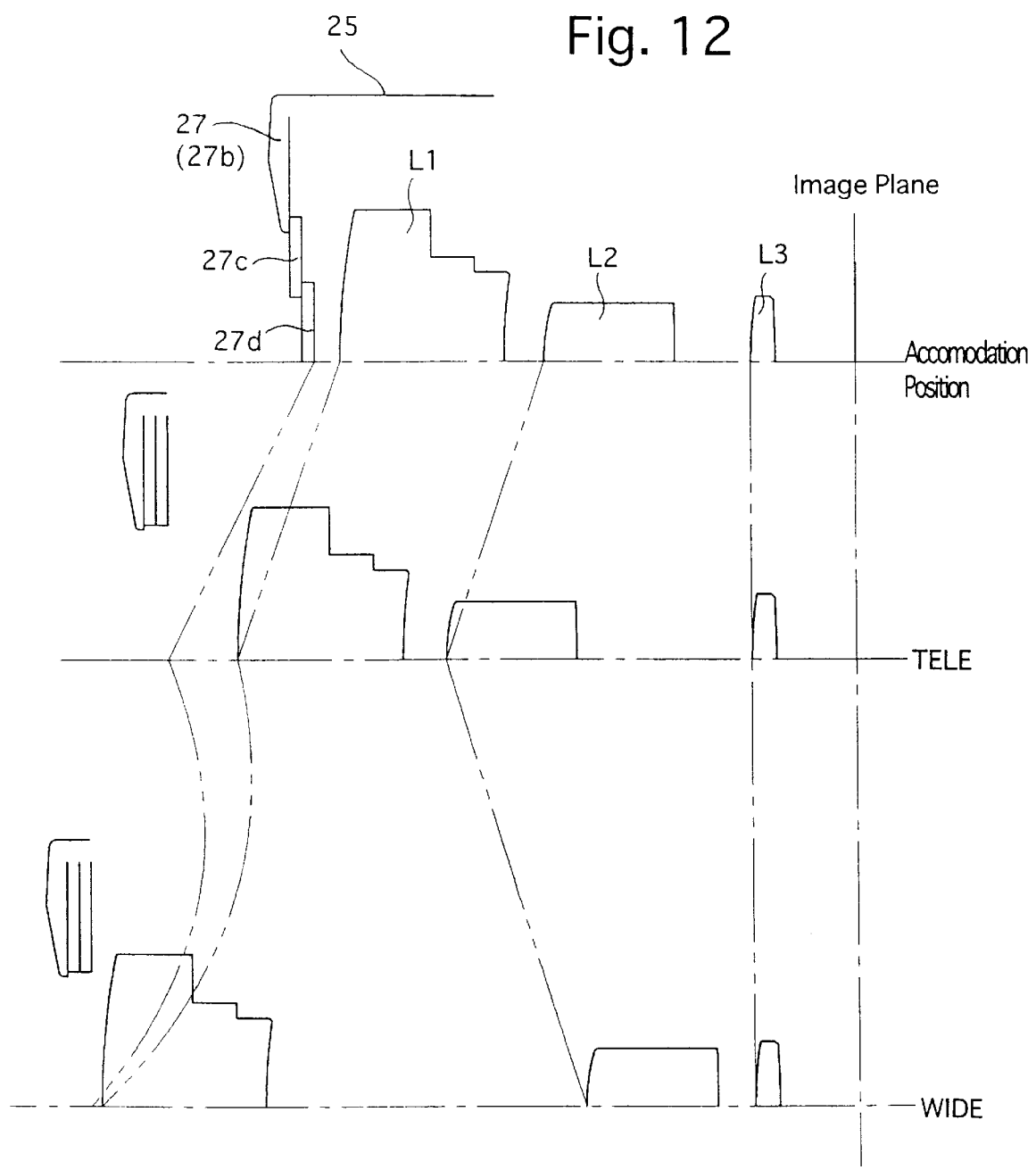
FIG. 12 is an explanatory view showing variations in axial position of the sensitive surface (image plane) of a CCD, the first lens group, a second lens group, and a barrier block when the zoom lens is driven from the accommodation position to the telephoto extremity and thereafter to the wide-angle extremity.

The external barrel 25 that is guided in the optical axis direction moves forward and rearward in the optical axis direction by rotation of the second cam barrel 18 in the above described manner. On the other hand, the first and second lens groups L1 and L2 move forward and rearward in the optical axis direction by rotation of the first cam barrel 17. FIG. 12 shows the axial position of the sensitive surface (image plane) of the CCD 12a on which subject images are formed through the photographic optical system, and the variations in the axial positions of the first lens group L1 (the principal point of the first lens group L1), the second lens group L2 (the principal point of the first lens group L2), and the barrier block 27 fixed to the front end of the external barrel 25 (more specifically,.the photographic aperture 27a formed on the panel 27b of the barrier block 27), when the zoom lens is driven from the accommodation position to the wide-angle extremity via the telephoto extremity. The contours of the first and second cam grooves 17C1 and 17C2 of the first cam barrel 17 and the guide grooves 18b of the second cam barrel 18 are determined so that the first lens group L1, the second lens group L2 and the barrier block 27 move in the optical axis direction to have the moving paths shown in FIG. 12 The photographic aperture 27a has a generally rectangular shape as viewed from the front of the digital camera. The angle of view in the diagonal direction of the photographic aperture 27a is greater than the angle of view in the lateral (horizontal) direction of the photographic aperture 27a, while the angle of view in the lateral direction of the photographic aperture 27a is greater than the angle of view in the longitudinal (vertical) direction of the photographic aperture 27a. In FIG. 10, an incident light ray S on the zoom lens along the angle of view in the longitudinal direction of the photographic aperture 27a, an incident light ray M on the zoom lens along the angle of view in the lateral direction of the photographic aperture 27a, and an incident light ray L on the zoom lens along the angle of view in the diagonal direction of the photographic aperture 27a are shown by two-dot chain lines.

A light shield barrel 26d which extends from the inner edge of the barrier drive ring 26 to the front end of the outer peripheral surface of the first lens frame 22 is adhered to the inner edge of the barrier drive ring 26 by an adhesive. The light shield barrel 26d is rotationally symmetrical about the optical axis O, so that the shielding characteristics of the light shield barrel 26d do not vary even if the light shield barrel 26d rotates forwardly and reversely together with the barrier drive ring 26 about the optical axis O.

Almost all the above mentioned elements of the zoom lens except for each spring, the feed screw 10e, the set screws 23f, the follower pins 22d, the follower pins 23d, the shutter block 24, the radially inward pins 25b, the flexible coding plate 14 and the brush 15 are made of synthetic resin. Although each lens element of the first, second and third lens groups L1, L2 and L3 can be made of a plastic, at least the frontmost lens element is preferably a glass lens for the purpose of preventing the front surface of the first lens group L1 from being scratched.

In the above illustrated embodiment, although the third lens group L3 functions as focusing lens group, the zoom lens can be modified so that the first lens group L1 or the second lens group L2 functions as focusing lens group. In the case where the second lens group L2 functions as focusing lens group, the shutter block can be modified to have an auto-focusing function. Such a shutter block is well-known in the art.

Neither the depth of each first cam groove 17C1, which is formed on the inner peripheral surface of the first cam barrel 17, nor the depth of each second cam groove 17C2, which is also formed on the inner peripheral surface of the first cam barrel 17, is constant. The depths of the first and second cam grooves 17C1 and 17C2 will be hereinafter discussed with reference to FIGS. 3 and 19

In FIG. 3, the right and left sides of the drawing correspond to the front and rear sides of the zoom lens in the optical axis direction, respectively. Although three first cam grooves 17C1 and three second cam grooves 17C2 are formed on the first cam barrel 17, only one first cam groove 17C1 and only one second cam groove 17C2 which are adjacent to each other in a circumferential direction of the first cam barrel 17 will be hereinafter discussed since the profiles of all the three first cam grooves 17C1 are the same and the profiles of all the three second cam grooves 17C2 are the same.

Figure 19:
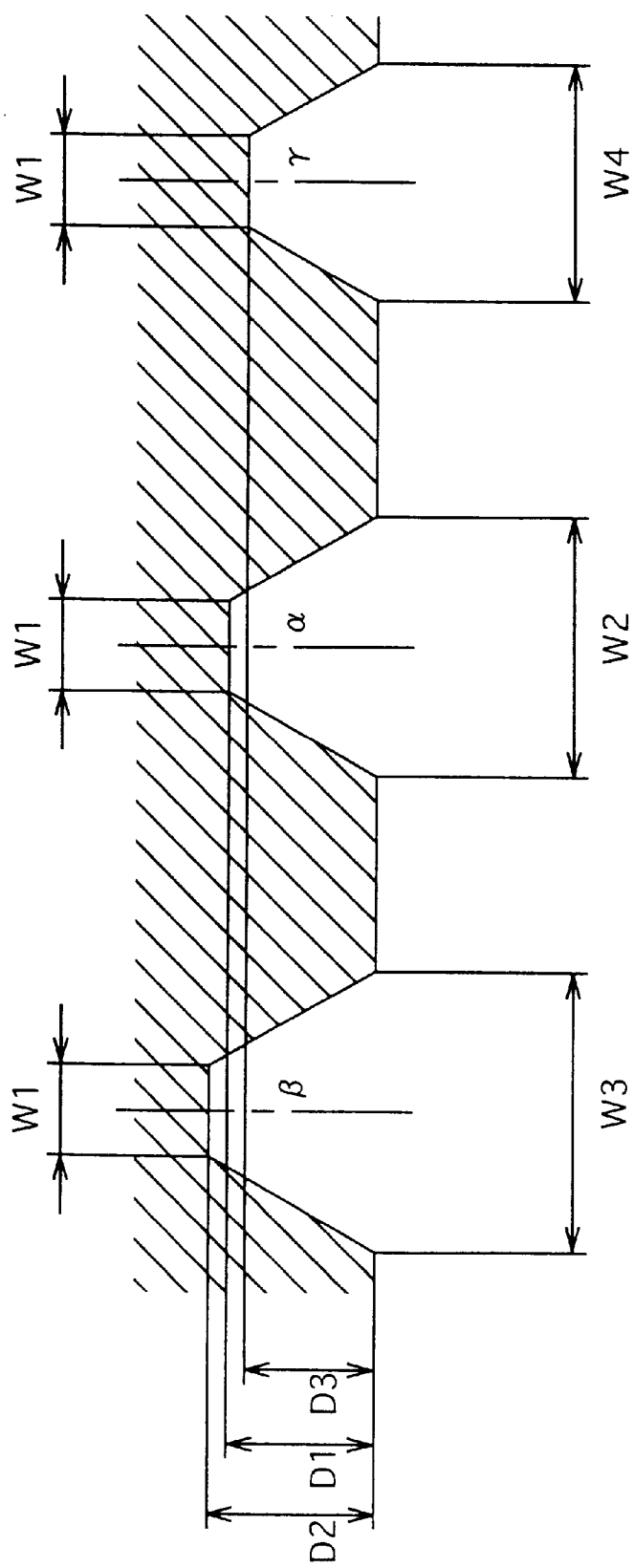
FIG. 19 is an explanatory cross sectional view of different portions of the cam grooves formed on an inner peripheral surface of the first cam barrel, showing differences in depth of the different portions.

Each of the first and second cam grooves 17C1 and 17C2 is provided, in an operational section thereof corresponding to the angle of rotation "A" shown in FIG. 3, with a zoom section (focal length varying section) which extends between the telephoto position (TELE) and the wide-angle position (WIDE). The zoom section, which is used during operation of the zoom lens, is formed as part of a normal cam portion (normal-depth groove portion) α whose cross section is shown in FIG. 19. In each of the first and second cam grooves 17C1 and 17C2, the normal cam portion α is formed sufficiently longer than the associated zoom section so that each end of the normal cam portion a extend beyond the wide-angle position (WIDE) and the telephoto position (TELE), respectively. In addition to the zoom section, each of the first and second cam grooves 17C1 and 17C2 is further provided in the operational section thereof with an accommodation section which extends between the telephoto position and the accommodation position. The accommodation section is used to retreat the zoom lens from the telephoto position to the accommodation position and to advance the zoom lens from the accommodation position to the telephoto position when the camera is turned OFF and ON, respectively.

In each of the first and second cam grooves 17C1 and 17c2, "β" shown in FIG. 3 designates a deep groove portion whose depth in a radial direction of the first cam barrel 17 is greater than the depth of the normal cam portion α. As shown in FIG. 19, the depth of the normal cam portion α is 'D1', and the depth of the deep groove portion β is 'D2'.

More specifically, the deep groove portion β of the first cam groove 17C1 has two sections: a leading section β1 and a terminal section β2. The leading section β1 extends from a cam follower insertion opening 17C1x of the first cam groove 17C1, which is open at the rear end of the first cam barrel 17, to a point in the vicinity of the accommodation position of the first cam groove 17C1 between the accommodation position and the telephoto position, so that the leading section β1 includes the accommodation position of the first cam groove 17C1. The terminal section β2 is formed at the cam dead end of the first cam groove 17C1 beyond the wide-angle position so as to be positioned at an assembling (or a disassembling) position Q which corresponds to a circumferential position of a cam follower insertion opening 17C2x of the second cam groove 17C2. The normal cam portion α of the first cam groove 17C1 is positioned between the leading section β1 and the terminal section β2, so that the he wide-angle position (WIDE) and the telephoto position (TELE) are included in the normal cam portion α. Furthermore, the normal cam portion α of the first cam groove 17C1 includes a connecting section y1 positioned between the wide-angle position of the zoom section and the terminal section β2.

The deep groove portion β of the second cam groove 17C2 has two sections: a leading section β3 and a terminal section β4. The leading section β3 extends from the cam follower insertion opening 17C2x of the second cam groove 17c2, which is open at the rear end of the first cam barrel 17, to a cam-turning point between the cam follower insertion opening 17C2x and the wide-angle position. In other words, the leading section β3 extends in an axial direction of the first cam barrel 17 so as to be positioned on the same circumferential position as the terminal section β2 of the first cam groove 17c1 (i.e., the assembling position Q). The terminal section (β4) is formed at the cam dead end of the second cam groove 17C2 beyond the telephoto position. The normal cam portion α of the second cam groove 17C2 is positioned between the leading section β3 and the terminal section β4, so that the wide-angle position (WIDE) and the telephoto position (TELE) are included in the normal cam portion α. Furthermore, the normal cam portion α of the second cam groove 17C2 includes a connecting section y2 positioned between the cam-turning point (an end of the leading section β3) and the wide-angle position of the zoom section.

The zoom section which is provided as part of the normal cam portion α of the first cam groove 17C1 and the zoom section which is provided as part of the normal cam portion α of the second cam groove 17C2 are formed in the same range in a circumferential direction of the first cam barrel 17. Furthermore, the section of the first cam groove 17C1 which defines the accommodation position thereof and corresponds to one end (the lower end as viewed in FIG. 3) of the leading section β1, and the section of the second cam groove 17C2 which defines the accommodation position thereof and corresponds to the terminal section β4 are formed in the same range in a circumferential direction of the first cam barrel 17.

The second cam groove 17C2 is further provided in the middle of the leading section β3)with a shallow groove portion γ which serves as a stop for preventing the associated follower pin 23d from moving toward the cam follower insertion opening 17C2x beyond the stop. The depth of the shallow groove portion γ in the radial direction of the first cam barrel 17 is smaller than that of the normal cam portion α. The depth of the shallow groove portion γ is shown as 'D3' in FIG. 19.

As shown in FIG. 19, the width of the bottom surface of the normal cam portion α, the width of the bottom surface of the deep groove portion β and the width of the bottom surface of the shallow groove portion γ are all the same ("W1" shown in FIG. 19). The side surfaces of each of the normal cam portion α, the deep groove portion β and the shallow groove portion γ are tapered radially outwards (upwards as viewed in FIG. 19) as can be seen in FIG. 19. The angle of the side surfaces of each of the normal cam portion α, the angle of the side surfaces of the deep groove portion β and the angle of the side surfaces of the shallow groove portion γ are also the same. Due to the same widths of the bottom surfaces and the same angles of the side surfaces, the normal cam portion α, the deep groove portion β and the shallow groove portion γ can be easily made even if the depth of each of the first and second cam grooves is not constant. The width W2 of the opening of the normal cam portion α, the width W3 of the opening of the deep groove portion β and the width W4 of the opening of the shallow groove portion γ are different from one another. Namely, the width W3 is larger than the width W2, and the width W2 is larger than the width W4.

When the follower pins 22d and 23d are positioned in the normal cam portions α of the first and second cam grooves 17C1 and 17C2, respectively, each of the first resilient extending pieces 22b and each of the second resilient extending pieces 23b are slightly elastically deformed inwards in the radial direction. Note that the first resilient extending pieces 22b are integrally formed with the first lens frame 22, and the second resilient extending pieces 23b are integrally formed with the second lens frame 23.

The resilient bias (i.e., the resilient biasing force) of each of the first and second resilient extending pieces 22b and 23b causes each of the follower pins 22d and 23d to be biased against the corresponding groove 17C1 or 17C2, to thereby remove play between the follower pins 22b and 23b and the first and second cam grooves 17C1 and 17C2, respectively. Accordingly, each of the follower pins 22d and 23d is positioned in the zoom section, the first and second lens frames 22 and 23 are supported by the linear guide barrel 16 and the first cam barrel 17 therein with substantially no play to thereby be optically centered with high precision, so that eccentricity and tilt of each of the first and second lens groups L1 and L2 relative to the optical axis O are prevented from occurring during operation of the zoom lens.

On the other hand, when the first cam barrel 17 is rotated from a rotational position thereof corresponding to the telephoto position (TELE) shown in FIG. 3 to another rotational position thereof corresponding to the accommodation position shown in FIG. 3, each of the follower pins 22d and 23d moves in the corresponding cam groove 17C1 or 17C2 from the normal cam portion α to the deep groove portion β in the middle of the rotation of the first cam barrel 17. Upon entry of each of the follower pins 22d and 23d into the deep groove portion β, the bottom portion (i.e., the bottom surface, and partial areas of the tapered side surfaces which are adjacent to the bottom surface) of the corresponding cam groove 17C1 or 17C2 is spaced from the tip of the follower pin 22d or 23d to allow the tip to move radially outwards. As a result, each of the first and second resilient extending pieces 22b and 23b is free from being elastically deformed inwards in the radial direction. This allows each of the follower pins 22d and 23d to be inserted in the corresponding cam groove 22d and 23d with a predetermined amount of play. Therefore, when the zoom lens is in the accommodation position, each of the first and second resilient extending pieces 22b and 23b is not deformed in the radial direction at all.

In a zoom lens having a cam barrel provided in the bottomed cam grooves thereof with an accommodation position where the zoom lens barrel is accommodated when the power of the camera is turned OFF, the time that the zoom lens stays in the accommodation position is generally much longer than the time that the zoom lens stays in the zoom section between the telephoto position and the wide-angle position. Due to this fact, if each of the first and second resilient extending pieces 22b and 23b continues to be resiliently deformed for a long period of time, the resilient bias (i.e., the resilient biasing force) of each of the first and second resilient extending pieces 22b and 23b gradually becomes weak. Once the resilient bias of each of the first and second resilient extending pieces 22b and 23b has become weak, eccentricity and tilt of each of the first and second lens groups L1 and L2 relative to the optical axis O cannot be reliably prevented from occurring during operation of the zoom lens even when the follower pins 22d and 23d are positioned in the normal cam portions α of the first and second cam grooves 17C1 and 17C2, respectively. This may deteriorate the optical performance of the zoom lens.

However, in the present embodiment of the zoom lens, each of the first and second resilient extending pieces 22b and 23b is not deformed in the radial direction at all when the zoom lens is in the accommodation position, the resilient bias (i.e., the resilient biasing force) of each of the first and second resilient extending pieces 22b and 23b does not become weak even if the zoom lens stays in the accommodation position for a long period of time. There is no problem in practice if each of the follower pins 22d and 23d is inserted in the accommodation position of the corresponding cam groove 17C1 or 17C2 with a predetermined amount of play, since no photographic operation is performed when the zoom lens is in the accommodation position. If each of the follower pins 22d and 23d moves in the corresponding cam groove 17C1 or 17C2 from the accommodation position toward the zoom section, each of the follower pins 22d and 23d is positioned in the normal cam portion α, so that each of the first resilient extending pieces 22b and each of the second resilient extending pieces 23b are elastically deformed slightly inwards in the radial direction, which causes each of the follower pins 22d and 23d to be biased against the corresponding groove 17C1 or 17C2, to thereby remove play between the follower pins 22b and 23b and the first and second cam grooves 17C1 and 17C2, respectively. Consequently, the positions of the first and second lens frames 22 and 23 on the optical axis O can be controlled with high precision.

An operation of coupling the first and second lens frames 22 and 23 to first cam barrel 17, wherein the follower pins 22d and 23d are respectively fitted in the first and second cam grooves 17C1 and 17C2, will be hereinafter discussed. As mentioned above, the first cam groove 17C1 has the cam follower insertion opening 17C1x which is open at the rear end of the first cam barrel 17, and the second cam groove 17C2 also has the cam follower insertion opening 17C2x which is open at the rear end of the first cam barrel 17. Firstly, the three follower pins 22d are respectively inserted into the three first cam grooves 17C1 via the three cam follower insertion openings 17C1x, and subsequently, the linear guide barrel 16 and the first cam barrel 17 are rotated relative to each other until each follower pin 22d reaches the cam dead end (terminal section β2, assembling position Q) of the corresponding first cam groove 17C1. This relative rotation between the linear guide barrel 16 and the first cam barrel 17 causes the first lens frame 22 to move in the optical axis direction without rotating about the optical axis O in accordance with the profiles of the first cam grooves 17C1 since the square projections 22c of the first lens frame 22 are guided by the three linear guide slots 16c in the optical axis direction without rotating about the optical axis O. Moving each follower pin 22d to the cam dead end of the corresponding first cam groove 17C1 causes the first lens frame 22 to move to the front of the first cam barrel 17.

Subsequently, the three follower pins 23d of the second lens frame 23 are respectively inserted into the three second cam grooves 17C2 via the three cam follower insertion openings 17C2x (the leading section β3, assembling position Q). Although one square projection 22c of the first lens frame 22 and one square projection 23c of the second lens frame 23 are fitted in a common linear guide through-slot (16c) to be guided linearly, the linear guide barrel 16 and the first cam barrel 17 are positioned relative to each other so that the three cam follower insertion openings 17C2x of the second cam grooves 17C2 and the three linear guide slots 16c are respectively aligned in a circumferential position about the optical axis when each follower pin 22d is positioned at the cam dead end (terminal section β2, assembling position Q) of the corresponding first cam groove 17C1; this is due to the above described cam design wherein the cam dead end of one first cam groove 17c1 and the cam follower insertion opening 17C2x of the corresponding second cam groove 17C2 are formed at the same circumferential position in a circumferential direction of the first cam barrel 17, namely, aligned in the optical axis direction. Accordingly, in a state where each follower pin 22d is positioned at the cam dead end (terminal section β2, assembling position Q) of the corresponding first cam groove 17C1, the three follower pins 23d of the second lens frame 23 can be respectively inserted into the three second cam grooves 17C2 via the three cam follower insertion openings 17C2x (the leading section β3, assembling position Q). Thereafter, if the linear guide barrel 16 and the first cam barrel 17 are rotated relative to each other until the follower pins 23d have reached the cam dead ends (terminal section β4) of the second cam grooves 17C2, each follower pin 22d is positioned at the accommodation position of the corresponding first cam groove 17C1, while each follower pin 23d is positioned at the accommodation position of the corresponding second cam groove 17C2.

An operation of removing the first and second lens frames 22 and 23 from the first cam barrel 17 is the reverse of the aforementioned operation of coupling the first and second lens frames 22 and 23 to the first cam barrel 17. Therefore, firstly each follower pin 23d of the second lens frame 23 is moved to the cam follower insertion opening 17C2x (i.e., the assembling position Q) of the second cam groove 17C2 and subsequently the second lens frame 23 is removed from the rear end of the linear guide barrel 16. Thereafter, each follower pin 22d of the first lens frame 22 is moved to the cam follower insertion opening 17C1x of the first cam groove 17C1 and subsequently the first lens frame 22 is removed from the rear end of the linear guide barrel 16.

In other words, each of the first cam grooves 17C1 includes an assembly section (the hatched areas shown in FIG. 3) which is used solely for the purpose of inserting each follower pin 22d into the corresponding cam groove 17C1 during assembly, or removing each follower pin 22d from the corresponding cam groove 17C1 during disassembly. Each of the second cam grooves 17C2 includes an assembly section (the hatched areas shown in FIG. 3) which is used solely for the purpose of inserting each follower pin 23d into the corresponding cam groove 17C2 during assembly, or removing each follower pin 23d from the corresponding cam groove 17C2 during disassembly.

In the present embodiment of the zoom lens, the ease of insertion and removal of the follower pins 22d and 23d into and from the first and second cam grooves 17C1 and 17c2 of the first cam barrel 17 is improved by providing each of the first and second cam grooves 17C1 and 17C2 with the above described variation in depth of groove.

In each of the first cam grooves 17C1, almost all of the assembly section (the hatched areas except for the connecting section y1) are formed as the deep groove portion β. When each of the follower pins 22d is positioned in the deep groove portion β, the bottom portion of the corresponding first cam groove 17C1 is spaced from the tip of the follower pin 22d to allow the tip to move radially outwards. As a result, each of the first resilient extending pieces 22b is free from being elastically deformed inwards in the radial direction This allows each of the follower pins 22d to be inserted in the corresponding first cam groove 17C1 with a predetermined amount of play. Likewise, in each of the second cam grooves 17C2, a portion of the assembly section (the hatched areas except for the connecting section y2 and the shallow groove portion γ) is formed as the deep groove portion β. When each of the follower pins 23d is positioned in the deep groove portion β, the bottom portion of the corresponding second cam groove 17C2 is spaced from the tip of the follower pin 23d to allow the tip to move radially outwards. As a result, each of the second resilient extending pieces 23b is free from being elastically deformed inwards in the radial direction. This allows each of the follower pins 23d to be inserted in the corresponding second cam groove 17C2 with a predetermined amount of play. Since the assembly sections of the first and second cam grooves 17C1 and 17C2 are used solely for the purpose of inserting each of the follower pins 22d and 23d into the corresponding cam groove 17C1 or 17C2 during assembly or removing each of the follower pins 22d or 23d from the corresponding cam groove 17C1 or 17C2 during disassembly, it is unnecessary to bias each of the follower pins 22d and 23d against the corresponding cam groove 17C1 or 17C2 in the assembly sections so as to make the first and second lens groups L1 and L2 optically centered with high precision.

Accordingly, in the present embodiment of the zoom lens, in each of the first and second cam grooves 17C1 and 17C2, the depth of (at least apart of) the assembly section (the deep groove portions β), which is used only during assembly or disassembly of the zoom lens, is formed to be greater than the depth of the associated normal cam portion α, which includes the zoom section used during photographing operation of the zoom lens so that each of the follower pins 22d and 23d is inserted in the corresponding cam groove 22d and 23d with a predetermined amount of play when positioned in the deep groove portion β. This structure contributes to reducing the frictional resistance between the follower pins 22d and 23d and the first and second cam grooves 17C1 and 17C2, respectively, which improves the ease of insertion and removal of the follower pins 22d and 23d into, and from, the first and second cam grooves 17C1 and 17C2 of the first cam barrel 17, respectively.

Note that, the connecting section y1 of the first cam grooves 17C1 and the connecting section y2 of the second cam grooves 17C2, which constitute part of the assembly section, are respectively formed as a part of the normal cam portion α. According to this construction, since the follower pins 22d and 23d can be held in the terminal section β2 and the leading section β3 (i.e., the assembly position Q) so as to maintain a predetermined amount of play therebetween, respectively, assembly and disassembly thereof can be carried out easily. However, the first cam groove 17C1 can be formed so that the connecting section y1 between the zoom section and the terminal section β2 is included as part of the deep groove portion β, as an alternative to the illustrated embodiment. Similarly, the second cam groove 17C2 can be formed so that the connecting section y2 between the zoom section and the leading section β3 is included as part of the deep groove portion β, as an alternative to the illustrated embodiment.

In regard to the second cam grooves 17C2, the shallow groove portion γ is formed immediately in front of each of the three cam follower insertion openings 17C2x in the optical axis direction, in the middle of the leading section β3. When one follower pin 23d passes the corresponding shallow groove portion γ, the associated resilient extending piece 23b is deformed inwards in the radial direction more than when the follower pin 23d is positioned in the normal cam portion α. Therefore, the frictional resistance between the follower pin 23d and the second cam groove 17C2 increases when the follower pin 23d passes the corresponding shallow groove portion γ. Accordingly, the shallow groove portion γ serves as a stop which prevents each follower pin 23d from coming off the corresponding second cam grooves 17C2 accidentally. If the follower pins 23d are prevented from coming off the second cam grooves 17C2, the second lens frame 23 does not come off the linear guide barrel 16 and the first cam barrel 17. If the second lens frame 23 does not come off the linear guide barrel 16 and the first cam barrel 17, the first lens frame 22, which is positioned in front of the second lens group 23 and which uses the three linear guide grooves 16 together with the second lens frame 23, does not come off the linear guide barrel 16 and the first cam barrel 17 either. When the second lens frame 23 is removed from the linear guide barrel 16 and the first cam barrel 17, each follower pin 23d only needs to be moved to the cam follower insertion opening 17C2x beyond the stop section 17C2c while each resilient extending piece 23b is deformed inwards in the radial direction a little further when each follower pin 23d reaches the shallow groove portion γ.

Accordingly, if an assemblage of the first cam barrel 17, the linear guide barrel 16, the first lens frame 22 and the second lens frame 23 is regarded as a subassembly of the zoom lens, a state of completion of the subassembly is maintained due to the shallow groove portion γ provided in each of the three second cam grooves 17C2, which improves the ease of the assembly task of the subassembly. Although the inner peripheral surface of the first cam barrel 17 is provided with two types of bottomed cam grooves (i.e., the first and second cam grooves 17C1 and 17C2) having different profiles, the aforementioned function to prevent each follower pin from coming off the corresponding bottomed cam groove accidentally can be achieved even if only one type of bottomed cam groove is provided on the inner peripheral surface of the first cam barrel 17, by providing the shallow groove portion γ in the middle of a leading section which extends from the cam follower insertion opening toward the zoom section of each cam groove 17C1 and 17C2.

As can be understood by the above description, according to the present embodiment of the zoom lens, the accommodation section of each bottomed cam groove is formed to have a depth greater than that of the associated zoom section, each resilient support is free from being elastically deformed in the radial direction. Therefore, the resilient bias of each resilient support does not become weak even if the zoom lens stays in the accommodation position for a long period of time. This prevents the optical performance of the zoom lens from deteriorating.

Moreover, as can be understood by the above description, according to the present embodiment of the zoom lens, since the assembly section (the deep groove portion) of each bottomed cam groove which is used solely for assembly or disassembly of the zoom lens is formed to have a depth greater than that of the associated zoom section, the frictional resistance between the follower pins 22d and 23d and the first and second cam grooves 17C1 and 17C2 is reduced when each follower pin 23d moves in the assembly section (the deep groove portion), which improves the ease of assembly and disassembly of the zoom lens. Furthermore, if the shallow groove portion is formed in the middle of the leading section (which extends from the cam follower insertion opening toward the zoom section) of each bottomed cam groove, each follower pin is prevented from coming off the corresponding bottomed cam groove accidentally, which also improves the ease of assembly and disassembly of the zoom lens.

As can be understood from the foregoing, according to the zoom lens having a cam mechanism to which the present invention is applied, a zoom lens having a cam mechanism which reliably prevents eccentricity and tilt of a lens group relative to the optical axis from occurring during operation of the zoom lens while maintaining the performance of prevention of lens eccentricity and tilt over the long term can be obtained.

Further, according to the zoom lens having a cam mechanism to which the present invention is applied, a zoom lens having a cam mechanism which reliably prevents eccentricity and tilt of a lens group relative to the optical axis from occurring during operation of the zoom lens, and wherein the zoom lens is easy to assemble and disassemble can be achieved.

It should be noted that, although the present invention is applied to a zoom lens of a digital camera, the present invention can be applied to a zoom lens of a conventional zoom camera using sensitive film.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom lens barrel comprising:

a cam barrel driven to rotate about an optical axis;

bottomed cam grooves formed on an inner peripheral surface of said cam barrel;

a lens frame guided in an optical axis direction of said zoom lens barrel;

cam followers which project radially from said lens frame to be respectively engaged with said bottomed cam grooves; and resilient supports which respectively support said cam followers, each of said resilient supports being resiliently deformable in a radial direction, a resilient bias of each of said resilient supports causing each of said cam followers to be biased against each of said bottomed cam grooves;

wherein each of said bottomed cam grooves comprises:
a zoom section for moving said lens frame between a telephoto position and a wide-angle position thereof in said optical axis direction in accordance with a rotational movement of said cam barrel; and
an accommodation section for moving said lens frame to an accommodation position thereof; wherein a photographic operation is not performed;

wherein each of said bottomed cam grooves is formed so that a depth of said accommodation section is greater than a depth of said zoom section in said radial direction of said cam barrel;

wherein said resilient bias of each of said resilient supports causes each of said cam followers to be biased against each of said bottomed cam grooves wherein said cam followers are respectively fitted in said bottomed cam grooves so that no play exists when each of said bottomed cam grooves is positioned in said zoom section, and wherein each of said resilient supports is free from being elastically deformed in said radial direction so that said cam followers are respectively inserted in said bottomed cam grooves with a predetermined amount of play when each of said bottomed cam grooves is positioned in said accommodation section.

2. The zoom lens barrel according to claim 1, wherein said bottomed cam grooves comprises a first set of bottomed cam grooves having same profiles and a second set of bottomed cam grooves having same profiles, said profiles of said second set of bottomed cam grooves being different from said profiles of said first set of bottomed cam grooves;

wherein said lens frame comprises a first lens frame and a second lens frame;

wherein said cam followers comprise a first set of cam followers which are provided on said first lens frame and a second set of cam followers which are provided on said second lens frame, said first set of cam followers being respectively engaged with said first set of bottomed cam grooves, and said second set of cam followers being respectively engaged with said second set of bottomed cam grooves;

wherein said resilient supports comprise a first set of resilient supports which resiliently support said first set of cam followers, and a second set of resilient supports which resiliently support said second set of cam followers; and wherein each bottomed cam groove of said first set of bottomed cam grooves and said second set of bottomed cam grooves is formed so that the depth of said accommodation section is greater than the depth of said zoom section in said radial direction of said cam barrel.

3. The zoom lens barrel according to claim 2, wherein said zoom sections of each bottomed cam groove of said first set of bottomed cam grooves and each corresponding bottomed cam groove of said second set of bottomed cam grooves are formed on said inner peripheral surface of said cam barrel in the same range in a circumferential direction of said cam barrel.

4. The zoom lens barrel according to claim 1, wherein three of each of said cam followers, said bottomed cam grooves, and said resilient supports are provided at an equi-angular distance about the optical axis.

5. The zoom lens barrel according to claim 1, wherein said zoom section and said accommodation section of each of said bottomed cam grooves respectively comprises:

a bottom surface; and a pair of opposing tapered side surfaces connected to said bottom surface, said pair of tapered side surfaces being respectively tapered so as to diverge away from each other as said pair of tapered side surfaces extend away from said bottom surface.

6. The zoom lens barrel according to claim 5, wherein a width of said bottom surface in said zoom section and a width of said bottom surface in said accommodation section are the same.

7. The zoom lens barrel according to claim 1, further comprising:
a linear guide barrel which is associated with said lens frame to guide said lens frame in said optical axis direction.

8. The zoom lens barrel according to claim 7, wherein said linear guide barrel is positioned inside said cam barrel and comprises linear guide through-slots extending parallel to said optical axis;
wherein said resilient supports comprise guide projections which are fitted in said linear guide through-slots from the inside of said linear guide barrel, respectively, so that said resilient supports are resiliently deformable inwards in said radial direction; and
wherein said cam followers project from said guide projections outwards in said radial direction to be respectively fitted in said bottomed cam grooves.

9. The zoom lens barrel according to claim 7, wherein said linear guide barrel and said cam barrel are connected to each other to be relatively immovable in said optical axis direction and relatively rotatable about said optical axis.

10. The zoom lens barrel according to claim 1, wherein said resilient supports are formed integrally with said lens frame so that each of said resilient supports can be resiliently deformed in the radial direction.

11. The zoom lens barrel according to claim 1, wherein said zoom lens barrel is incorporated in a digital camera.

12. A zoom lens barrel comprising:
a linear guide barrel, guided in an optical axis direction without rotating about said optical axis, having linear guide through-slots which extend parallel to said optical axis;
a cam barrel fitted on said linear guide barrel to be immovable in said optical axis direction relative to said linear guide barrel and rotatable about said optical axis relative to said linear guide barrel, said cam barrel having bottomed cam grooves which are formed on an inner peripheral surface of said cam barrel;
a lens frame having cam followers which are respectively engaged with said bottomed cam grooves, and guide projections which are respectively engaged with said linear guide through-slots;
resilient supports formed on said lens frame to support said cam followers, respectively, each of said resilient supports being resiliently deformable radially, a resilient bias of each of said resilient supports causing each of said cam followers to be biased against a corresponding bottomed cam groove of said bottomed cam grooves;
wherein each of said bottomed cam grooves comprises:
a zoom section for moving said lens frame, in said optical axis direction, between a telephoto position and a wide-angle position thereof in accordance with rotation of said cam barrel; and
an accommodation section for moving said lens fame to an accommodation position thereof, wherein a photographic operation is not performed;
wherein each of said bottomed cam grooves is formed so that a depth of said accommodation section is greater than a depth of said zoom section in a radial direction of said cam barrel;
wherein said resilient bias of each of said resilient supports causes each of said cam followers to be biased against each of said bottomed cam grooves wherein said follower pins are respectively fitted in said bottomed cam grooves so that no play occurs when each of said bottomed cam grooves is positioned in said zoom section; and
wherein each of said resilient supports is free from being elastically deformed in said radial direction so that said cam followers are respectively inserted in said bottomed cam grooves with a predetermined amount of play when each of said bottomed cam grooves is positioned in said accommodation section.

13. A zoom lens barrel comprising:
a cam barrel driven to rotate about an optical axis;
bottomed cam grooves formed on an inner peripheral surface of said cam barrel;
a lens frame guided in an optical axis direction;
cam followers which project radially from said lens frame to be respectively engaged with said bottomed cam grooves; and
resilient supports which respectively support said cam followers, each of said resilient supports being resiliently deformable in a radial direction, a resilient bias of each of said resilient supports causing each of said cam followers to be biased against a corresponding bottomed cam groove of said bottomed cam grooves;
wherein each of said bottomed cam grooves comprises a deep groove portion, so that each of said resilient supports is free from being elastically deformed in said radial direction so that said cam followers are respectively inserted in said bottomed cam grooves with a predetermined amount of play when each of said bottomed cam grooves is positioned in said deep groove portion; and
wherein said deep groove portion includes at least a part of an assembly section of each of said bottomed cam grooves, through which a corresponding cam follower of said cam followers passes only during assembly of said zoom lens.

14. The zoom lens barrel according to claim 13, wherein each of said bottomed cam grooves further comprises a normal-depth groove portion whose depth is smaller than a depth of said deep groove portion in said radial direction, so that, when each of said cam followers is positioned in said normal-depth groove portion, said resilient bias of each of said resilient supports causes each of said cam followers to be biased against each of said bottomed cam grooves wherein said cam followers are respectively fitted in said bottomed cam grooves with no play, and
wherein said normal-depth groove portion includes a zoom section for moving said lens frame between a telephoto position and a wide-angle position thereof in said optical axis direction in accordance with rotation of said cam barrel.

15. The zoom lens barrel according to claim 14, wherein said deep groove portion comprises a leading section for leading said corresponding cam follower from a cam follower insertion opening, which is open at one end of said cam barrel, to said normal-depth groove portion;
wherein each of said bottomed cam grooves comprises a shallow groove portion in the middle of said leading section, and
wherein a depth of said shallow groove portion is smaller than a depth of said normal-depth groove portion in said radial direction of said cam barrel.

16. The zoom lens barrel according to claim 14, wherein said normal-depth groove portion and said deep groove portion of each of said bottomed cam grooves respectively comprises:

a bottom surface; and a pair of opposing tapered side surfaces connected to said bottom surface, said pair of tapered side surfaces being respectively tapered so as to diverge away from each other as said pair of tapered side surfaces extend away from said bottom surface.

17. The zoom lens barrel according to claim 16, wherein a width of said bottom surface in said normal-depth groove portion and a width of said bottom surface in said deep groove portion are the same.

18. The zoom lens barrel according to claim 13, wherein three of each of said cam followers, said bottomed cam grooves, and said resilient supports are provided at an equi-angular distance about the optical axis.

19. A zoom lens barrel comprising:

a cam barrel driven to rotate about an optical axis;

first bottomed cam grooves formed on an inner peripheral surface of said cam barrel;

second bottomed cam grooves formed on said inner peripheral surface of said cam barrel and having different profiles from said first bottomed cam grooves;

a first lens frame having first cam followers which are respectively engaged with said first bottomed cam grooves;

a second lens frame having second cam followers which are respectively engaged with said second bottomed cam grooves; and a linear guide barrel which is associated with said first lens frame and said second lens frame to guide said first lens frame and said second lens frame in an optical axis direction;

wherein each of said first bottomed cam grooves comprises:

a first zoom section for moving said first lens frame between a telephoto position thereof and a wide-angle position thereof in accordance with rotation of said cam barrel;

a first leading section for leading a corresponding one of said first cam followers from a first cam follower insertion opening, which is open at one end of said cam barrel, toward said first zoom section; and a terminal section positioned on the opposite side of said first zoom section with respect to said first leading section;

wherein each of said first leading section and said terminal section is formed as a first deep groove portion used only during assembly of said zoom lens barrel, a depth of said first deep groove portion being greater than a depth of said first zoom section in a radial direction of said cam barrel;

wherein each of said second bottomed cam grooves comprises:

a second zoom section for moving said second lens frame between a telephoto position thereof and a wide-angle position thereof in accordance with rotation of said cam barrel; and a second leading section for leading a corresponding one of said second cam followers from a second cam follower insertion opening which is open at said one end of said cam barrel, toward said second zoom section;

wherein said second leading section is formed as a second deep groove portion used during assembly of said zoom lens barrel, a depth of said second deep groove portion being greater than a depth of said second zoom section in said radial direction of said cam barrel;

wherein said terminal section and said second cam follower insertion opening are formed at the same circumferential position in a circumferential direction of said cam barrel; and wherein, upon assembly of said first lens frame and said second lens frame to said cam barrel and said linear guide barrel, said first cam followers are respectively inserted into said first leading sections via said first cam follower insertion openings, said linear guide barrel and said cam barrel are rotated relative to each other until said first cam followers reach respective said terminal section of a corresponding one of said first bottomed cam grooves, and subsequently, said second cam followers are respectively inserted into said second leading sections via said second cam follower insertion openings.

20. The zoom lens barrel according to claim 19, wherein said leading section comprises a shallow groove portion in the middle of said second leading section; and wherein a depth of said shallow groove portion is smaller than a depth of said second zoom section in said radial direction of said cam barrel.

21. The zoom lens barrel according to claim 19, wherein each of said first bottomed cam grooves comprises a first connecting section positioned between said first zoom section and said terminal section, through which a corresponding cam follower of said first cam followers passes only during assembly of said zoom lens barrel, wherein a depth of said first connecting section is the same as the depth of said first zoom section in said radial direction, and wherein said first cam follower can be held in said terminal section of said first bottomed cam groove, due to the difference of depth between said terminal section and said connecting section.

22. The zoom lens barrel according to claim 19, wherein each of said second bottomed cam grooves comprises a second connecting section positioned between said second zoom section and said second leading section, through which a corresponding cam follower of said second cam followers passes only during assembly of said zoom lens barrel, wherein a depth of said second connecting section is the same as the depth of said second zoom section in said radial direction, and wherein said second cam follower can be held in said leading section of said second bottomed cam groove, due to the difference of depth between said leading section and said connecting section.

23. The zoom lens barrel according to claim 19, further comprising:

first resilient supports which respectively support said first cam followers, each of said first resilient supports being resiliently deformable in said radial direction, a resilient bias of each of said first resilient supports causing each of said first cam followers to be biased against a corresponding bottomed cam groove of said first bottomed cam grooves; and second resilient supports which respectively support said second cam followers, each of said second resilient supports being resiliently deformable in said radial direction, a resilient bias of each of said second resilient supports causing each of said second cam followers to be biased against a corresponding bottomed cam groove of said second bottomed cam grooves;

wherein said first cam followers are respectively fitted in said first zoom section of said first bottomed cam grooves so that no play occurs during zooming, due to a resilient bias of said first resilient supports which are elastically deformed in said radial direction;

wherein said second cam followers are respectively fitted in said second zoom section of said second bottomed cam grooves so that no play occurs during zooming, due to a resilient bias of said second resilient supports which are elastically deformed in said radial direction, wherein said first cam followers are respectively inserted in said first leading section with a predetermined amount of play and said terminal section of said first bottomed cam grooves, so that each of said first resilient supports is free from being elastically deformed in said radial direction, and wherein said second cam followers are respectively inserted in said second leading section of said second bottomed cam grooves with a predetermined amount of play, so that each of said second resilient supports is free from being elastically deformed in said radial direction.

24. The zoom lens barrel according to claim 19, wherein said linear guide barrel and said cam barrel are connected to each other to be relatively immovable in said direction of said optical axis and relatively rotatable about said optical axis.

25. The zoom lens barrel according to claim 19, wherein said zoom lens barrel is incorporated in a digital camera.

* * * * *